(12) United States Patent
Kaida et al.

(10) Patent No.: US 10,184,384 B2
(45) Date of Patent: Jan. 22, 2019

(54) SPHERICAL ANNULAR SEAL MEMBER AND METHOD OF MANUFACTURING THE SAME

(75) Inventors: Hidetoshi Kaida, Kanagawa (JP); Kouhei Kurose, Kanagawa (JP)

(73) Assignee: Oiles Corporation, Tokyo (JP)

( * ) Notice: Subject to any disclaimer, the term of this patent is extended or adjusted under 35 U.S.C. 154(b) by 346 days.

(21) Appl. No.: 13/878,527

(22) PCT Filed: Oct. 12, 2011

(86) PCT No.: PCT/JP2011/005709
§ 371 (c)(1),
(2), (4) Date: Apr. 9, 2013

(87) PCT Pub. No.: WO2012/053168
PCT Pub. Date: Apr. 26, 2012

(65) Prior Publication Data
US 2013/0187347 A1    Jul. 25, 2013

(30) Foreign Application Priority Data

Oct. 19, 2010 (JP) ................................. 2010-234982

(51) Int. Cl.
*F16J 15/12* (2006.01)
*F01N 13/18* (2010.01)
(Continued)

(52) U.S. Cl.
CPC ......... *F01N 13/1827* (2013.01); *F01N 13/16* (2013.01); *F01N 13/1811* (2013.01);
(Continued)

(58) Field of Classification Search
CPC ....... F16L 23/18; F16L 27/053; F16L 27/073; F01N 13/1827; F16J 15/121; F16J 15/126; F16J 15/0812
(Continued)

(56) References Cited

U.S. PATENT DOCUMENTS 4,830,383 A * 5/1989 Probst ...................... F16J 15/14
                                                        277/316
4,951,954 A    8/1990 Macneill
(Continued)

FOREIGN PATENT DOCUMENTS

EP    1 146 262    10/2001
EP    1 923 609    5/2008
(Continued)

OTHER PUBLICATIONS

International Search Report for PCT/JP2011/005709 dated Nov. 22, 2011.
(Continued)

*Primary Examiner* — Vishal A Patel
*Assistant Examiner* — Stacy N Lawson
(74) *Attorney, Agent, or Firm* — Nixon & Vanderhye P.C.

(57) ABSTRACT

In a spherical annular seal member 38, a spherical annular base member 36 is constructed so as to be provided with structural integrity as a heat-resistant material 6 and a reinforcing member 5 are compressed to each other and intertwined with each other. In an outer layer 37, the heat-resistant material 6, a sintered solid lubricant constituted by a lubricating composition, and the reinforcing member 5 made from a metal wire net are compressed such that the sintered solid lubricant and the heat-resistant material 6 are filled in meshes of the metal wire net of the reinforcing member 5, and the solid lubricant, the heat-resistant material 6, and the reinforcing member 5 are integrated in mixed form, an outer surface 39 of that outer layer 37 being thus formed into a smooth surface 42 in which a surface 40 constituted by the reinforcing member 5 and a surface 41 constituted by the sintered solid lubricant are present in mixed form.

8 Claims, 7 Drawing Sheets

(51) Int. Cl.
*F16L 23/18* (2006.01)
*F16L 27/053* (2006.01)
*F16L 27/073* (2006.01)
*F01N 13/16* (2010.01)

(52) U.S. Cl.
CPC ........... *F16J 15/121* (2013.01); *F16J 15/126* (2013.01); *F16L 27/053* (2013.01); *F16L 27/073* (2013.01); *F01N 13/1855* (2013.01); *F01N 2260/10* (2013.01); *F01N 2310/14* (2013.01); *F01N 2450/00* (2013.01); *F01N 2530/00* (2013.01)

(58) Field of Classification Search
USPC .................. 277/611, 627, 650–654; 156/148
See application file for complete search history.

(56) References Cited

U.S. PATENT DOCUMENTS

| | | | | |
|---|---|---|---|---|
| 5,795,454 | A | * | 8/1998 | Friese .................. G01N 27/407 204/424 |
| 5,909,881 | A | * | 6/1999 | Segawa .................. F16C 23/04 277/592 |
| 2004/0066007 | A1 | | 4/2004 | Kubota et al. |
| 2007/0114729 | A1 | * | 5/2007 | Hagano ................ C09D 127/12 277/628 |
| 2008/0211195 | A1 | | 9/2008 | Miyamoto et al. |
| 2010/0253011 | A1 | * | 10/2010 | Maeda .................... F01N 13/08 277/626 |
| 2010/0270754 | A1 | | 10/2010 | Kubota et al. |
| 2011/0088834 | A1 | | 4/2011 | Miyamoto et al. |

FOREIGN PATENT DOCUMENTS

| | | |
|---|---|---|
| EP | 2 216 570 | 8/2010 |
| JP | 54-76759 | 6/1979 |
| JP | 4-48973 | 8/1992 |
| JP | 6-123362 | 5/1994 |
| JP | 2006-29368 | 2/2006 |
| JP | 2006-29369 | 2/2006 |
| JP | 2006-225433 | 8/2006 |
| JP | 2006-322601 | 11/2006 |
| JP | 2008-75803 | 4/2008 |
| JP | 2009-144884 | 7/2009 |
| WO | WO 2008/015775 | 2/2008 |
| WO | WO 2009/072295 | 6/2009 |
| WO | WO 2009/078165 | 6/2009 |

OTHER PUBLICATIONS

Extended European Search Report issued in Application No. 11834014.0 dated Dec. 10, 2015.
Indian Office Action issued in Appln. No. 928/KOLNP/2013 dated Apr. 3, 2018.

* cited by examiner

SPHERICAL ANNULAR SEAL MEMBER AND METHOD OF MANUFACTURING THE SAME

This application is the U.S. national phase of International Application No. PCT/JP2011/005709 filed 12 Oct. 2011 which designated the U.S. and claims priority to JP 2010-234982 filed 19 Oct. 2010, the entire contents of each of which are hereby incorporated by reference.

TECHNICAL FIELD

The present invention relates to a spherical annular seal member used in a spherical pipe joint for an automobile exhaust pipe and a method of manufacturing the same.

BACKGROUND ART

As for exhaust gases of an automobile engine, in FIG. 19 which shows one example of an exhaust passage of an automobile engine, exhaust gases generated in the respective cylinders (not shown) of the engine are gathered in an exhaust manifold catalyst converter 600 and are sent to a sub muffler 603 through an exhaust pipe 601 and an exhaust pipe 602. The exhaust gases which passed through this sub muffler 603 are further sent to a muffler 606 through an exhaust pipe 604 and an exhaust pipe 605, and are released to the atmosphere through this muffler 606.

Exhaust system members such as these exhaust pipes 601 and 602 as well as 604 and 605, the sub muffler 603, and the muffler 606 are subjected to repeated stress owing to such as the roll behavior and vibration of the engine. Particularly in the case of a high-speed rotation and high-output engine, the stress applied to the exhaust system members becomes quite large. Accordingly, the exhaust system members have a possibility of bringing about a fatigue failure, and the engine vibration can cause the exhaust system members to resonate, thereby deteriorating compartment quietness in some cases. To overcome these problems, a connecting portion 607 between the exhaust manifold catalyst converter 600 and the exhaust pipe 601 and a connecting portion 608 between the exhaust pipe 604 and the exhaust pipe 605 are movably connected by a vibration absorbing mechanism such as an exhaust pipe spherical joint or a bellows type joint, whereby advantages are provided in that the stress is absorbed to which the exhaust system members are repeatedly subjected due to such as the roll behavior and vibration of the automobile engine, thereby preventing the fatigue failure and the like of these exhaust system members and overcoming the problem that the engine vibration causes the exhaust system members to resonate and deteriorates the quietness of the compartment interior of automobile.

PRIOR ART DOCUMENTS

Patent Documents

Patent Document 1: JP-A-54-76759
Patent Document 2: JP-B-4-48973
Patent Document 3: JP-A-6-123362

SUMMARY OF THE INVENTION

Problems to be Solved by the Invention

As one example of the above-described vibration absorbing mechanism, it is possible to cite an exhaust pipe joint described in Patent Document 1 and an exhaust seal which is used in that joint. The seal member used in the spherical pipe joint described in Patent Document 1 has advantages in that, in comparison with a bellows type joint, it makes it possible to attain a reduction in the manufacturing cost and excels in durability. However, this seal member is formed such that a heat-resistant material made from expanded graphite and a reinforcing member made from a metal wire net are compressed to fill meshes of the metal wire net of the reinforcing member with the heat-resistant material, and this heat-resistant material and the reinforcing member are thereby integrated in mixed form. As such, this seal member has the problem of occurrence of abnormal frictional noise due to the presence of the heat-resistant material at the surface of the partially convex spherical surface which comes into slidable contact with the mating member, in addition to the problem of leakage of exhaust gases through the spherical annular seal member itself owing to such as the proportion of the reinforcing member to the heat-resistant material and the degree of compression of the heat-resistant material and the reinforcing member. For example, if the proportion of the reinforcing member to the heat-resistant material is large, and the degree of compression of the heat-resistant material is low, there are possibilities that initial leakage can occur due to a decline in the degree of sealing by the heat-resistant material with respect to infinitesimal passages (gaps) occurring around the reinforcing member, and that exhaust gases can leak in an early stage due to such as the oxidative wear of the heat-resistant material under high temperature. In addition, if the rate of exposure of the heat-resistant material with respect to the reinforcing member at the partially convex spherical surface is very large, the stick-slip phenomenon can occur, possibly causing the generation of abnormal frictional noise ascribable to that stick-slip phenomenon.

As a seal member for overcoming the drawbacks of the above-described exhaust seal, one disclosed in Patent Document 2 is known. This seal member is formed by superposing a reinforcing member made from a metal wire net on a sheet-like heat-resistant material made from expanded graphite with a polytetrafluoroethylene resin filled therein and coated thereon, so as to form a belt-shaped composition, by convoluting the belt-shaped composition such that the surface with the polytetrafluoroethylene resin filled therein and coated thereon is placed on the outer side, so as to form a hollow cylindrical laminate, and by subjecting the hollow cylindrical laminate to compression forming along the axial direction of the laminate. Thus, a seal member is described in which the surface with the polytetrafluoroethylene resin filled therein and coated thereon is exposed on the outer peripheral surface constituting a sliding surface (sealing surface). As for this seal member, the polytetrafluoroethylene resin coated and formed on the surface exhibits operational effects such as the reduction of the coefficient of friction and the prevention of transfer of the heat-resistant material for forming the base member onto the surface of a mating member. Further, since the frictional resistance of the polytetrafluoroethylene resin does not exhibit negative resistance with respect to the sliding velocity, an additional effect is obtained in that the generation of self-excited vibration based on the slick-slip phenomenon (adhesion-slippage) can be suppressed, coupled with the above-described operational effects, thereby contributing to the prevention of generation of abnormal frictional noise.

The seal member described in the above-described Patent Document 2 overcomes the problems of the exhaust seal described in the above-described Patent Document 1. However, the effect that the generation of self-excited vibration based on the slick-slip phenomenon is suppressed and a contribution is thereby made to the prevention of generation of abnormal frictional noise, which is an operational effect of the seal member disclosed in Patent Document 2, is limited to the use in which the ambient temperature acting on the seal member is the melting point (327° C.) or below of the polytetrafluoroethylene resin, and, in the use at an ambient temperature exceeding that melting point, the abnormal frictional noise attributable to the stick-slip phenomenon is occasionally generated inevitably.

The seal member described in Patent Document 3 has the advantage of being able to obviate as practically as possible the drawback of the occurrence of abnormal frictional noise due to the presence of the heat-resistant material at the surface of the partially convex spherical surface of the seal member described in Patent Document 1 which comes into slidable contact with the mating member, since its sliding surface (surface of the partially convex spherical surface) is formed into a smooth surface where the deformed and intertwined reinforcing member made from the metal wire net and a solid lubricant filled and held in the meshes of the metal wire net of the reinforcing member are integrated in mixed form. However, alumina in the solid lubricant in the seal member described in this Patent Document can cause damage to the surface of the mating member, and hence there are possibilities of frequently resulting in the generation of abnormal frictional noise and causing a decline in sealability.

The present invention concerns improvements of the spherical annular seal member described in the aforementioned Patent Document 3, and its object is to provide a spherical annular seal member which is capable of eliminating the generation of abnormal frictional noise in sliding with a mating member and has stable sealing characteristics, as well as a method of manufacturing the same.

Means for Solving the Problems

A spherical annular seal member in accordance with the present invention is a spherical annular seal member for use in an exhaust pipe joint which comprises: a spherical annular base member defined by a cylindrical inner surface, a partially convex spherical surface, and large- and small-diameter side annular end faces of the partially convex spherical surface; and an outer layer formed integrally on the partially convex spherical surface of the spherical annular base member, wherein the spherical annular base member includes a reinforcing member made from a metal wire net and a heat-resistant material containing expanded graphite and compressed in such a manner as to fill meshes of the metal wire net of the reinforcing member and to be integrated with the reinforcing member in mixed form, and wherein, in the outer layer, a heat-resistant material containing expanded graphite, a sintered solid lubricant of a lubricating composition containing 23 to 75% by mass of hexagonal boron nitride and 23 to 75% by mass of a molten fluorocarbon resin, and a reinforcing member made from a metal wire net are compressed such that the solid lubricant and the heat-resistant material are filled in meshes of the reinforcing member, and such that the solid lubricant, the heat-resistant material, and the reinforcing member are integrated in mixed form, an outer surface of the outer layer being formed into a smooth surface in which a surface constituted by the reinforcing member and a surface constituted by the solid lubricant are present in mixed form.

According to the spherical annular seal member in accordance with the present invention, in the outer layer formed integrally with the partially convex spherical surface of the spherical annular base member serving as a sliding member with respect to a mating member, a heat-resistant material containing expanded graphite, a sintered solid lubricant of a lubricating composition containing 23 to 75% by mass of hexagonal boron nitride and 23 to 75% by mass of a molten fluorocarbon resin, and a reinforcing member made from a metal wire net are compressed such that the solid lubricant and the heat-resistant material are filled in meshes of the metal wire net of the reinforcing member, and such that the solid lubricant, the heat-resistant material, and the reinforcing member are integrated in mixed form, an outer surface of the outer layer being formed into a smooth surface in which a surface constituted by the reinforcing member and a surface constituted by the solid lubricant are present in mixed form. As such, since sliding with the mating member takes place at this smooth surface where the sintered solid lubricant and the reinforcing member are present in mixed form, there is no possibility of causing damage to the surface of the mating member, and it is possible to prevent the generation of abnormal frictional noise.

The lubricating composition may contain graphite at a ratio of not more than 16% by mass. In addition, either one of a tetrafluoroethylene-hexafluoropropylene copolymer (FEP) and a tetrafluoroethylene-perfluoroalkylvinylether copolymer (PFA) may be suitably used as the molten fluorocarbon resin in the aforementioned sintered solid lubricant. Also, hexagonal boron nitride exhibits excellent lubricity particularly in a high-temperature range and is contained in the lubricating composition at a ratio of 23 to 75% by mass.

In the spherical annular seal member in accordance with the present invention, in the spherical annular base member and the outer layer, a reinforcing member made from a metal wire net may be contained at a ratio of 40 to 65% by mass, and a solid lubricant and a heat-resistant material containing expanded graphite may be contained at a ratio of 35 to 60% by mass, and the heat-resistant material and the solid lubricant in the spherical annular base member and the outer layer may preferably have a density of 1.20 to 2.00 Mg/m$^3$. Further, in the outer layer, the reinforcing member made from the metal wire net may be contained at a ratio of 60 to 75% by mass, and the solid lubricant and the heat-resistant material containing expanded graphite may be contained at a ratio of 25 to 40% by mass.

In the spherical annular seal member in accordance with the present invention, since the outer layer has an outer surface which is formed by an exposed surface where a surface constituted by the reinforcing member and a surface constituted by the sintered solid lubricant are present in mixed form, it is possible to ensure smooth sliding with the mating member which is in contact (slides) with the outer surface of the outer layer. In addition, the surface constituted by the solid lubricant in the outer surface can be held by the surface constituted by the reinforcing member, and it is possible to appropriately effect both the transfer of the solid lubricant from the outer surface of the outer layer onto the surface of the mating member and the scraping off of an excessive solid lubricant transferred onto the surface of the mating member, with the result that it is possible to ensure smooth sliding over extended periods of time, and the generation of abnormal frictional noise in sliding with the mating member can be eliminated.

In the spherical annular seal member in accordance with the present invention, the heat-resistant material may contain as an oxidation inhibitor 0.1 to 16.0% by mass of a phosphate or 0.05 to 5% by mass of phosphorus pentoxide, or 0.1 to 16.0% by mass of a phosphate, 0.05 to 5.0% by mass of phosphorus pentoxide, and expanded graphite.

The heat-resistant material containing as an oxidation inhibitor a phosphate or phosphorus pentoxide, or a phosphate, phosphorus pentoxide, and expanded graphite is able to improve the heat resistance and anti-oxidative wear characteristics of the spherical annular seal member itself, and permits the use of the spherical annular seal member in a high-temperature region.

A method of manufacturing a spherical annular seal member in accordance with the present invention for use in an exhaust pipe joint and including a spherical annular base member defined by a cylindrical inner surface, a partially convex spherical surface, and large- and small-diameter side annular end faces of the partially convex spherical surface, and an outer layer formed integrally on the partially convex spherical surface of the spherical annular base member, comprises the steps of: (a) preparing a heat-resistant material constituted by an expanded graphite sheet; (b) preparing a reinforcing member made from a metal wire net which is obtained by weaving or knitting a fine metal wire, and, after forming a superposed assembly by superposing the reinforcing member on the heat-resistant material, convoluting the superposed assembly into a hollow cylindrical shape, to thereby form a tubular base member; (c) preparing an aqueous dispersion of a lubricating composition constituted by a molten fluorocarbon resin powder, a hexagonal boron nitride powder, a surfactant, and water; (d) preparing another heat-resistant material constituted by an expanded graphite sheet, applying the aqueous dispersion onto one surface of the other heat-resistant material, and drying the same, to thereby form on a surface of the heat-resistant material a coating layer of a solid lubricant constituted by a lubricating composition containing a hexagonal boron nitride and a molten fluorocarbon resin; (e) sintering the coating layer of the solid lubricant coated on the surface of the heat-resistant material at a temperature of not less than a melting point of the molten fluorocarbon resin, to thereby form a sintered coating layer of the solid lubricant on the one surface of the heat-resistant material; (f) inserting the heat-resistant material having the sintered coating layer between two layers constituted by a metal wire net of another reinforcing member made from a metal wire net obtained by weaving or knitting a fine metal wire, and feeding the reinforcing member with the heat-resistant material inserted between the two layers constituted by the metal wire net into a nip between a pair of rollers so as to pressurize the same, such that the heat-resistant material and the sintered coating layer on the surface of the heat-resistant material are filled in meshes of the metal wire net of the reinforcing member, to thereby form a flattened outer-layer forming member on a surface of which a surface constituted by the reinforcing member and a surface constituted by the sintered coating layer are exposed in mixed form; (g) convoluting the outer-layer forming member around an outer peripheral surface of the tubular base member with its sintered coating layer facing outside, to thereby form a cylindrical preform; and (h) fitting the cylindrical preform over an outer peripheral surface of a core of a die, placing the core in the die, and subjecting the cylindrical preform to compression forming in the die in an axial direction of the core, wherein the spherical annular base member is formed so as to be provided with structural integrity as the heat-resistant material containing expanded graphite and the reinforcing member made from the metal wire net are compressed and intertwined with each other, and wherein, in the outer layer, a heat-resistant material containing expanded graphite, a sintered solid lubricant constituted by a lubricating composition containing hexagonal boron nitride and a molten fluorocarbon resin, and a reinforcing member made from a metal wire net are compressed such that the sintered solid lubricant and the heat-resistant material are filled in meshes of the metal wire net of the reinforcing member, and such that the sintered solid lubricant, the heat-resistant material, and the reinforcing member are integrated in mixed form, an outer surface of the outer layer being formed into a smooth surface in which a surface constituted by the reinforcing member and a surface constituted by the sintered solid lubricant are present in mixed form.

According to the method of manufacturing a spherical annular seal member in accordance with the present invention, as the solid lubricant of the sintered coating layer constituted by a lubricating composition containing at least hexagonal boron nitride and a molten fluorocarbon resin on one surface of the heat-resistant material is held by the reinforcing member made from the metal wire net, the outer surface of the outer layer of the spherical annular seal member can be formed by an exposed surface where a surface constituted by the reinforcing member and a surface constituted by the solid lubricant of the sintered coating layer are present in mixed form. Therefore, it is possible to ensure further smooth sliding with the mating member which is in contact (slides) with the outer surface of the outer layer. In addition, the surface constituted by the solid lubricant of the sintered coating layer in the exposed surface can be held by the surface constituted by the reinforcing member, and it is possible to appropriately effect both the transfer of the sintered solid lubricant from the outer surface of the outer layer onto the surface of the mating member and the scraping off of the film of an excessive solid lubricant transferred onto the surface of the mating member, with the result that it is possible to obtain a spherical annular seal member which ensures smooth sliding over extended periods of time, and can eliminate the generation of abnormal frictional noise in sliding with the mating member.

In the method of manufacturing a spherical annular seal member in accordance with the present invention, the aqueous dispersion of the lubricating composition which is coated on one surface of the heat-resistant material is composed of a molten fluorocarbon resin powder with an average particle size of 0.01 to 1 μm which is obtained by an emulsion polymerization method, a hexagonal boron nitride powder with an average particle size of 0.01 to 1 μm, a surfactant, and water. A graphite powder may be further contained in this aqueous dispersion, and an aqueous organic solvent may be contained in this aqueous dispersion.

Either one of a tetrafluoroethylene-hexafluoropropylene copolymer (FEP) and a tetrafluoroethylene-perfluoroalkyl-vinylether copolymer (PFA) may be suitably used as the molten fluorocarbon resin. The content of the molten fluorocarbon resin powder contained in the aqueous dispersion is preferably 11.5 to 45% by mass, more preferably 27.5 to 33% by mass.

The content of the hexagonal boron nitride powder contained in the aqueous dispersion is preferably 11.5 to 45% by mass, more preferably 22.5 to 27% by mass. The hexagonal boron nitride exhibits excellent lubricity particularly in a high-temperature region, and 0.01 to 13.5% by mass of a surfactant may be contained in such an aqueous dispersion.

Further, in a preferred example, the aqueous dispersion is composed of 11.5 to 45% by mass of a molten fluorocarbon resin powder, 11.5 to 45% by mass of hexagonal boron nitride, 0.01 to 13.5% by mass of a surfactant, and 25 to 45% by mass of water.

The aqueous dispersion comprised of the molten fluorocarbon resin powder and the hexagonal boron nitride powder described above may further contain 0.5 to 9% by mass, preferably 1 to 5% by mass, of a graphite powder. The graphite powder improves film formability of the sliding layer constituted by the molten fluorocarbon resin composition onto the surface of the mating member.

In the method of manufacturing a spherical annular seal member in accordance with the present invention, the coating layer constituted by the lubricating composition formed by applying the aqueous dispersion to one surface of the heat-resistant material by means of roller coating, brushing, spraying, or the like is dried, and is subsequently sintered in a heating furnace. The sintering temperature is in a range of the melting point T of the molten fluorocarbon resin to (T+150° C.), preferably (T+5° C.) to (T+135° C.), more preferably (T+10° C.) to (T+125° C.). In the case of a tetrafluoroethylene-hexafluoropropylene copolymer (FEP), the melting point is 240° C., so that the sintering temperature falls within a range of 240 to 390° C., preferably 245 to 375° C., more preferably 250 to 365° C. In the case of a tetrafluoroethylene-perfluoroalkylvinylether copolymer (PFA), the melting point is 305° C., so that the sintering temperature falls within a range of 305 to 455° C., preferably 310 to 440° C., more preferably 315 to 430° C. If the sintering temperature is excessively low, it becomes difficult to form a uniform coating layer of the molten fluorocarbon resin composition, whereas if the sintering temperature is excessively high, the thermal deterioration of the molten fluorocarbon resin composition is liable to occur.

In a preferred example of the method of manufacturing the spherical annular seal member in accordance with the present invention, in the spherical annular base member and the outer layer, a reinforcing member made from a metal wire net may be contained at a ratio of 40 to 65% by mass, and a solid lubricant and a heat-resistant material containing expanded graphite may be contained at a ratio of 35 to 60% by mass, and the heat-resistant material and the solid lubricant in the spherical annular base member and the outer layer may preferably have a density of 1.20 to 2.00 Mg/m³. Further, in the outer layer, the reinforcing member made from the metal wire net may be contained at a ratio of 60 to 75% by mass, and the solid lubricant and the heat-resistant material containing expanded graphite may be contained at a ratio of 25 to 40% by mass.

Advantages of the Invention

According to the present invention, it is possible to provide a spherical annular seal member which is capable of eliminating the leakage of exhaust gases and eliminating the generation of abnormal frictional noise, and has stable sealing characteristics, as well as a method of manufacturing the same.

MODE FOR CARRYING OUT THE INVENTION

Figure 1:
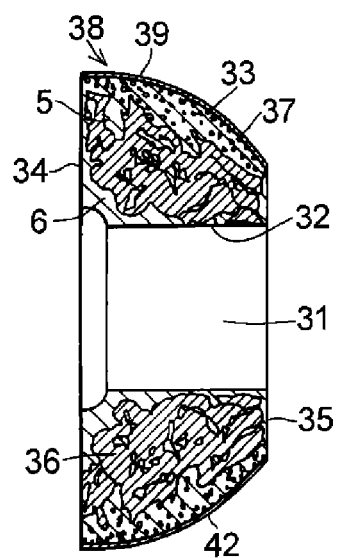
FIG. 1 is a vertical cross-sectional view of a spherical annular seal member which is manufactured in one embodiment of the present invention.

Next, a more detailed description will be given of the present invention and a mode for carrying it out on the basis of the preferred embodiments illustrated in the drawings. It should be noted that the present invention is not limited to these embodiments.

A description will be given of constituent materials of a spherical annular seal member and a method of manufacturing the spherical annular seal member in accordance with the invention.

<Concerning Heat-Resistant Material I and Manufacturing Method Thereof>

While concentrated sulfuric acid of a 98% concentration is being agitated, a 60% aqueous solution of hydrogen peroxide is added to it as an oxidizing agent, and this solution is used as a reaction solution. This reaction solution is cooled and kept at a temperature of 10° C., natural flake graphite powder having a particle size of 30 to 80 meshes is added to the reaction solution, and reaction is allowed to take place for 30 minutes. After the reaction, acid-treated graphite powder is separated by suction filtration, and a cleaning operation is repeated twice in which the acid-treated graphite powder is agitated in water for 10 minutes and is then subjected to suction filtration, thereby sufficiently removing the sulfuric acid content from the acid-treated graphite powder. Then, the acid-treated graphite powder with the sulfuric acid content sufficiently removed is dried for 3 hours in a drying furnace held at a temperature of 110° C., and this is used as an acid-treated graphite powder.

The above-described acid-treated graphite powder is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 240 to 300 times). These expanded graphite particles are fed to a twin roller apparatus adjusted to a desired roll nip and is subjected to roll forming, thereby fabricating an expanded graphite sheet having a desired thickness. This expanded graphite sheet is used as a heat-resistant material I.

<Concerning Heat-Resistant Material II and Manufacturing Method Thereof>

While acid-treated graphite powder obtained in a method similar to that of the above-described acid-treated graphite powder is being agitated, a solution in which an aqueous solution of aluminum primary phosphate $[Al(H_2PO_4)_3]$ of a 50% concentration as a phosphate is diluted with methanol is compounded with that acid-treated graphite powder by spraying, and is agitated uniformly to fabricate a mixture having wettability. This mixture having wettability is dried for two hours in a drying furnace held at a temperature of 120° C. Then, this mixture is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 240 to 300 times). In this expansion treatment process, water in the structural formula of aluminum primary phosphate is eliminated. These expanded graphite particles are fed to the twin roller apparatus adjusted to a desired roll nip and is subjected to roll forming, thereby fabricating an expanded graphite sheet having a desired thickness. This expanded graphite sheet is used as a heat-resistant material II.

In the heat-resistant material II thus fabricated, aluminum primary phosphate is contained in the expanded graphite at a ratio of 0.5 to 16% by mass. This expanded graphite containing the phosphate permits use at, for instance, 600° C. or a high-temperature range exceeding 600° C. since the heat resistance of the expanded graphite itself is improved and the oxidation inhibiting action is imparted thereto. As the phosphate, it is possible to use, in addition to the aforementioned aluminum primary phosphate, lithium secondary phosphate ($Li_2HPO_4$), calcium primary phosphate $[Ca(H_2PO_4)_2]$, calcium secondary phosphate ($CaHPO_4$), and aluminum secondary phosphate $[Al_2(HPO_4)_3]$.

<Concerning Heat-Resistant Material III and Manufacturing Method Thereof>

While acid-treated graphite powder obtained in a method similar to that of the above-described acid-treated graphite powder is being agitated, a solution in which an aqueous solution of aluminum primary phosphate of a 50% concentration as a phosphate and an aqueous solution of orthophosphoric acid ($H_3PO_4$) of a 84% concentration as a phosphoric acid are diluted with methanol is compounded with that acid-treated graphite powder by spraying, and is agitated uniformly to fabricate a mixture having wettability. This mixture having wettability is dried for two hours in a drying furnace held at a temperature of 120° C. Then, this mixture is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 240 to 300 times). In this expansion treatment process, water in the structural formula of aluminum primary phosphate is eliminated, and the orthophosphoric acid undergoes dehydration reaction to produce phosphorus pentoxide. These expanded graphite particles are fed to the twin roller apparatus adjusted to a desired roll nip and is subjected to roll forming, thereby fabricating an expanded graphite sheet having a desired thickness. This expanded graphite sheet is used as a heat-resistant material III.

In the heat-resistant material III thus fabricated, aluminum primary phosphate and phosphorus pentoxide are contained in the expanded graphite at a ratio of 0.5 to 16% by mass and at a ratio of 0.05 to 5% by mass, respectively. This expanded graphite containing the phosphate and phosphorus pentoxide permits use at, for instance, 600° C. or a high-temperature range exceeding 600° C. since the heat resistance of the expanded graphite itself is improved and the oxidation inhibiting action is imparted thereto. As the phosphoric acid, it is possible to use, in addition to the aforementioned orthophosphoric acid, metaphosphoric acid ($HPO_3$), polyphosphoric acid, and the like.

As the heat-resistant material, a sheet material having a density of 1.0 to 1.15 $Mg/m^3$ or thereabouts and a thickness of 0.3 to 0 6 mm or thereabouts is preferably used.

<Concerning Reinforcing Member>

As a reinforcing member, a woven or knitted metal wire net is used which is formed by weaving or knitting one or more fine metal wires including, as an iron-based wire, a stainless steel wire made of such as austenitic stainless steels SUS 304, SUS 310S, and SUS 316, a ferritic stainless steel SUS 430, or an iron wire (JIS-G-3532) or a galvanized steel wire (JIS-G-3547), or, as a copper wire, a wire member made of a copper-nickel alloy (cupro-nickel) wire, a copper-nickel-zinc alloy (nickel silver) wire, a brass wire, or a beryllium copper wire.

Figure 5:
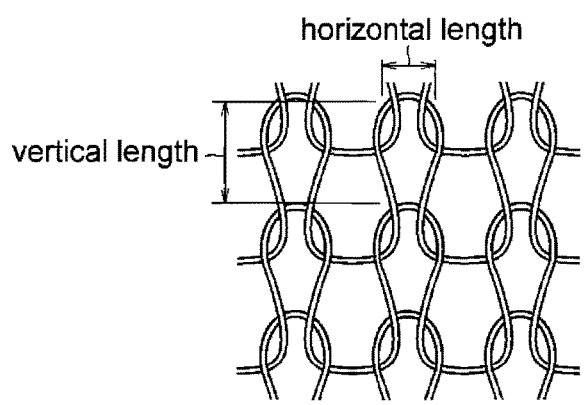
FIG. 5 is a plan view illustrating meshes of a metal wire net of the reinforcing member.

As the fine metal wire for forming the metal wire net, a fine metal wire whose diameter is 0.28 to 0.32 mm or thereabouts is used. In terms of the mesh size of the metal wire net (see FIG. 5 illustrating a woven metal wire net) for a spherical annular base member net formed by the fine metal wire of that diameter, a mesh size of 4 to 6 mm long and 3 to 5 mm wide or thereabouts is suitably used, whereas, in terms of the mesh size (see FIG. 5) of the metal wire net for an outer layer, a mesh size of 2.5 to 3.5 mm long and 1.5 to 2.5 mm wide or thereabouts is suitably used.

<Concerning Solid Lubricant and Coating Layer>

A solid lubricant consists of a lubricating composition which contains 23 to 75% by mass of a hexagonal boron nitride and 23 to 75% by mass of a molten fluorocarbon resin.

In the manufacturing process, this solid lubricant is used in the form of an aqueous dispersion which is composed of 12.5 to 45% by mass of a molten fluorocarbon resin powder with an average particle size of 0.01 to 1 μm, 12.5 to 45% by mass of a hexagonal boron nitride with an average particle size of 0.01 to 1 μm, 0.1 to 30% by mass of a surfactant, and the balance of water (25 to 45% by mass).

Either one of a tetrafluoroethylene-hexafluoropropylene copolymer (FEP) and a tetrafluoroethylene-perfluoroalkyl-vinylether copolymer (PFA) is used as the molten fluorocarbon resin. The content of the molten fluorocarbon resin powder contained in the aqueous dispersion is 11.5 to 45% by mass, preferably 27.5 to 33% by mass.

The hexagonal boron nitride exhibits excellent lubricity particularly in a high-temperature region, and the content of the hexagonal boron nitride powder contained in the aqueous dispersion is 11.5 to 45% by mass, preferably 22.5 to 27% by mass.

The surfactant contained in the aqueous dispersion suffices if it is capable of allowing the molten fluorocarbon resin powder to be uniformly dispersed in water, and it is possible to use any one of an anionic surfactant, a cationic surfactant, a nonionic surfactant, and an amphoteric surfactant. It is possible to cite, for example, anionic surfactants such as sodium alkyl sulfate, sodium alkyl ether sulfate, triethanol amine alkyl sulfate, triethanol amine alkyl ether sulfate, ammonium alkyl sulfate, ammonium alkyl ether sulfate, alkyl ether sodium phosphate, and sodium fluoroalkyl carboxylate; cationic surfactants such as alkyl ammonium salt and alkyl benzyl ammonium salt; nonionic surfactants such as polyoxyethylene alkyl ether, polyoxyethylene phenyl ether, polyoxyethylene alkyl ester, propylene glycol-propylene oxide copolymer, perfluoroalkyl ethylene oxide additive, and 2-ethyl-hexanol ethylene oxide additive; and amphoteric surfactants such as alkylaminoacetic acid betaine, alkylamidoacetic acid betaine, and imidazolium betaine. In particular, anionic and nonionic surfactants are preferable. Particularly preferable surfactants are nonionic surfactants having an oxyethylene chain in which the amount of pyrolytic residue is small.

The content of the surfactant is normally 0.1 to 30% by mass, particularly preferably 0.2 to 20% by mass, of the molten fluorocarbon resin powder content. If the content of the surfactant is excessively small, the dispersion of the molten fluorocarbon resin powder does not become uniform, whereas if the content of the surfactant is excessively large, the pyrolytic residue of the surfactant due to sintering becomes large and coloration takes place, additionally resulting in a decline in the heat resistance, nonadhesiveness, and the like of the coating layer.

The aqueous dispersion comprised of the molten fluorocarbon resin powder, the hexagonal boron nitride powder, and the surfactant described above may further contain 0.5 to 8% by mass, preferably 1 to 5% by mass, of a graphite powder. The graphite powder improves film formability of the sliding layer constituted by the molten fluorocarbon resin composition onto the surface of the mating member.

An aqueous organic solvent may be further contained in the aqueous dispersion comprised of the molten fluorocarbon resin powder, the hexagonal boron nitride powder, the surfactant, and water described above, or the molten fluorocarbon resin powder, the hexagonal boron nitride powder, the graphite powder, the surfactant, and water. For example, it is possible to cite alcohol-based solvents such as methanol, ethanol, butanol, isopropyl alcohol, and glycerin; ketone-based solvents such as acetone, methylethyl ketone, and methylisobutyl ketone; ether-based solvents such as methyl cellosolve, cellosolve, and butyl cellosolve; glycol-based solvents such as ethylene glycol, propylene glycol, triethylene glycol, and tetraethylene glycol; amide-based solvents such as dimethylformamide and dimethylacetamide; and lactam-based solvents such as N-methyl-2-pyrrolidone. The content of the aqueous organic solvent is 0.5 to 50% by weight, preferably 1 to 30% by weight, of the total amount of water. The aqueous organic solvent has the function of wetting the molten fluorocarbon resin and forms a uniform mixture with the hexagonal boron nitride, and since it evaporates during sintering, it does not adversely affect the coating.

As the aqueous dispersion of the molten fluorocarbon resin composition, any one of the following aqueous dispersions is used: (1) an aqueous dispersion composed of 12.5 to 45% by mass of a molten fluorocarbon resin powder with an average particle size of 0.01 to 1 μm, 12.5 to 45% by mass of a hexagonal boron nitride powder with an average particle size of 0.01 to 1 μm, 0.01 to 13.5% by mass of a surfactant, and the balance of 25 to 45% by mass of water, (2) an aqueous dispersion composed of 12.5 to 45% by mass of a molten fluorocarbon resin powder with an average particle size of 0.01 to 1 μm, 12.5 to 45% by mass of a hexagonal boron nitride powder with an average particle size of 0.01 to 1 μm, 0.5 to 8% by mass of a graphite powder, 0.01 to 13.5% by mass of a surfactant, and the balance of 25 to 45% by mass of water, (3) an aqueous dispersion in which 0.1 to 22.5% by mass of an aqueous organic solvent is further contained in the aqueous dispersion in (1) above; and (4) an aqueous dispersion in which 0.1 to 22.5% by mass of an aqueous organic solvent is further contained in the aqueous dispersion in (2) above.

The aforementioned aqueous dispersion is applied to one surface of the heat-resistant material by means of roller coating, brushing, spraying, or the like, and a coating layer of a solid lubricant constituted by a lubricating composition is formed on the one surface of that heat-resistant material. The coating layer of the solid lubricant is dried and is subsequently sintered in a heating furnace for 10 to 30 minutes at a temperature in a range of the melting point T of the molten fluorocarbon resin to (T+150° C.), preferably (T+5° C.) to (T+135° C.), more preferably (T+10° C.) to (T+125° C.), thereby forming a sintered coating layer of the solid lubricant on the one surface of the heat-resistant material.

Next, referring to the drawings, a description will be given of a method of manufacturing a spherical annular seal member composed of the above-described constituent materials.

Figure 3:
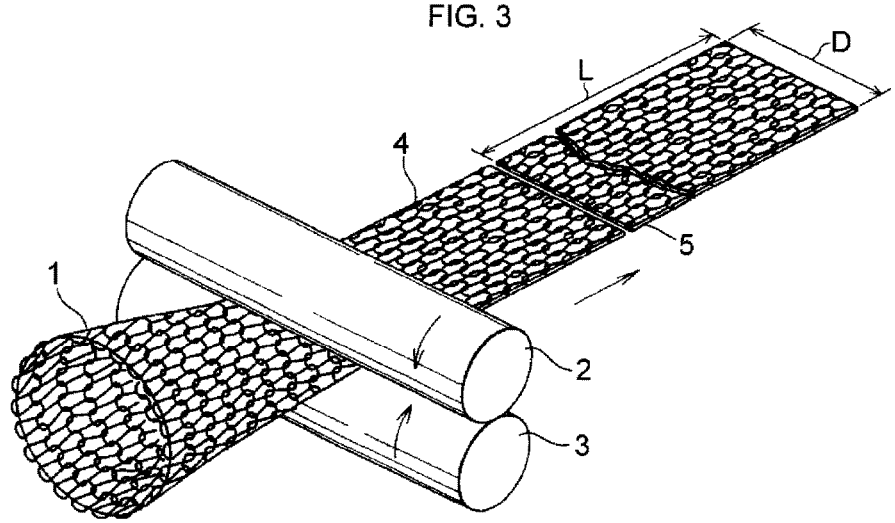
FIG. 3 is a diagram explaining a method of forming a reinforcing member in a process of manufacturing the spherical annular seal member in accordance with the present invention.

(First Process) As shown in FIG. 3, a hollow cylindrical knitted metal wire net 1, which is formed by knitting a fine metal wire with a diameter of 0.28 to 0.32 mm into a cylindrical shape and whose mesh size is 4 to 6 mm long and 3 to 5 mm wide or thereabouts (see FIG. 5), is passed between rollers 2 and 3, thereby fabricating a belt-shaped metal wire net 4 having a predetermined width D. A reinforcing member 5 is then prepared by cutting the belt-shaped metal wire net 4 into a predetermined length L.

Figure 4:
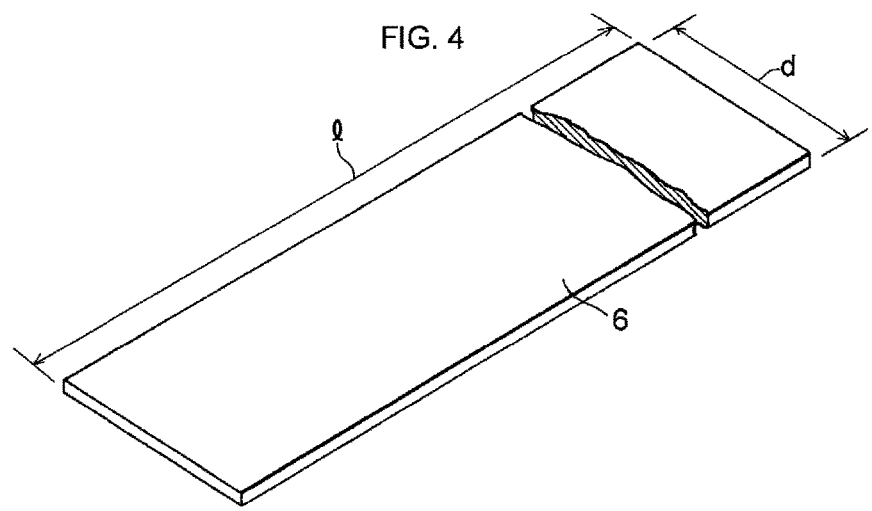
FIG. 4 is a perspective view of a heat-resistant material in the process of manufacturing the spherical annular seal member in accordance with the present invention.

(Second Process) As shown in FIG. 4, a heat-resistant material 6 (composed of one of the heat-resistant material I, the heat-resistant material II, and the heat-resistant material III) for the spherical annular base member is prepared whose density is 1.0 to 1.5 Mg/m$^3$, preferably 1.0 to 1.2 Mg/m$^3$, so as to have a width d of from (1.10×D) mm to (2.10×D) mm with respect to the width D of the above-described reinforcing member 5 and a length l of from (1.30×L) mm to (2.70×L) mm with respect to the length L of the reinforcing member 5.

Figure 6:
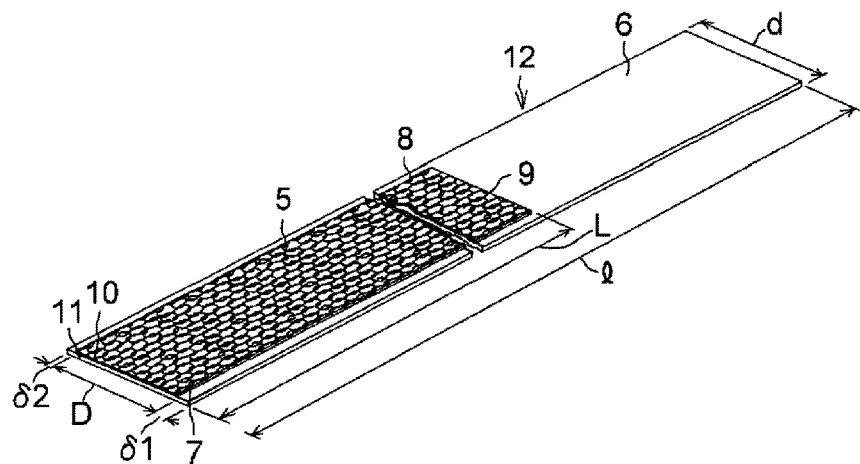
FIG. 6 is a perspective view of a superposed assembly in the process of manufacturing the spherical annular seal member in accordance with the present invention.

(Third Process) A superposed assembly 12 in which the heat-resistant material 6 and the reinforcing member 5 are superposed one on top of the other is prepared as follows: To ensure that the heat-resistant material 6 is wholly exposed on a large-diameter side annular end face 34 of a partially convex spherical surface 33 in a below-described spherical annular seal member 38 (see FIG. 1), as shown in FIG. 6, the heat-resistant material 6 is made to project in the widthwise direction by a maximum of (0.10 to 0.80)×D mm from one widthwise end 7 of the reinforcing member 5, which serves as the large-diameter side annular end face 34 of the partially convex spherical surface 33. Also, the amount of widthwise projection, δ1, of the heat-resistant material 6 from the end 7 is made greater than the amount of its widthwise projection, δ2, from the other widthwise end 8 of the reinforcing member 5, which serves as a small-diameter side annular end face 35 of the partially convex spherical surface 33. Further, the heat-resistant material 6 is made to project in the longitudinal direction by a maximum of (0.30 to 1.70)×L mm from one longitudinal end 9 of the reinforcing member 5, while the other longitudinal end 10 of the reinforcing member 5 and a longitudinal end 11 of the heat-resistant material 6 corresponding to that end 10 are made to agree with each other.

Figure 7:
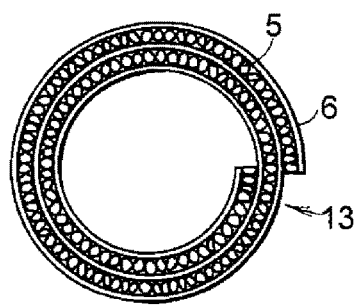
FIG. 7 is a plan view of a tubular base member in the process of manufacturing the spherical annular seal member in accordance with the present invention.
Figure 8:
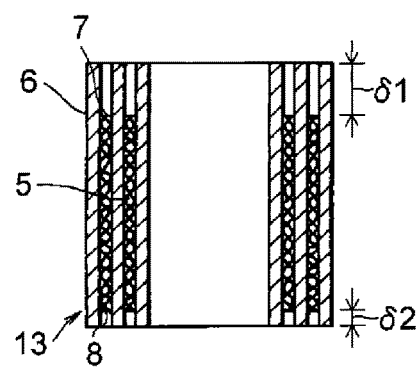
FIG. 8 is a vertical cross-sectional view of the tubular base member shown in FIG. 7.

(Fourth Process) As shown in FIG. 7, the superposed assembly 12 is convoluted with the heat-resistant material 6 placed on the inner side such that heat-resistant material 6 is convoluted with one more turn, thereby forming a tubular base member 13 in which the heat-resistant material 6 is exposed on both the inner peripheral side and the outer peripheral side. As the heat-resistant material 6, one is prepared in advance which has a length l of from (1.30×L) mm to (2.70×L) mm with respect to the length L of the reinforcing member 5 so that the number of winding turns of the heat-resistant material 6 in the tubular base member 13 becomes greater than the number of winding turns of the reinforcing member 5. In the tubular base member 13, as shown in FIG. 8, the heat-resistant material 6 on its one widthwise end side projects in the widthwise direction by δ1 from the one end 7 of the reinforcing member 5, and the heat-resistant material 6 on its other widthwise end side projects in the widthwise direction by δ2 from the other end 8 of the reinforcing member 5.

Figure 9:
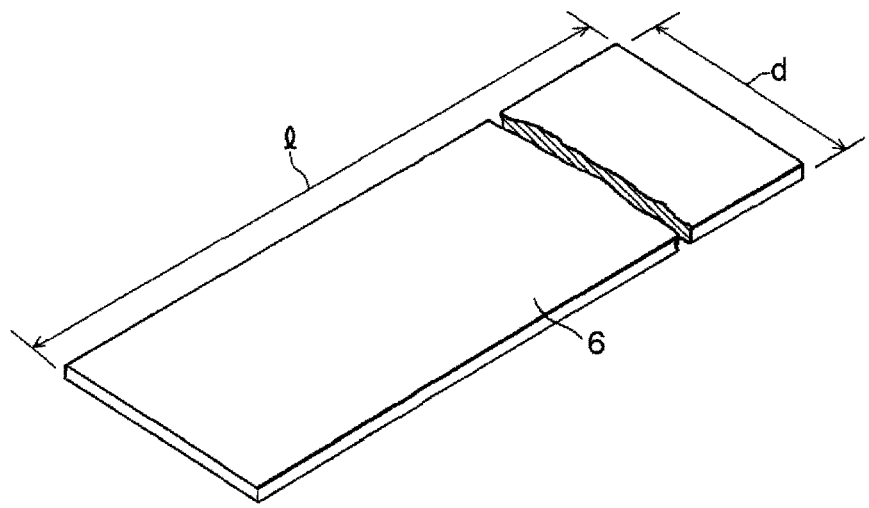
FIG. 9 is a perspective view of the heat-resistant material in the process of manufacturing the spherical annular seal member in accordance with the present invention.

(Fifth Process) Another heat-resistant material 6 such as the one shown in FIG. 9 is separately prepared which is similar to the above-described heat-resistant material 6 but has a smaller width d than the width D of the reinforcing member 5 and has a length l of such a measure as to be able to be wound around the tubular base member 13 by one turn.

(Sixth Process) As the aqueous dispersion, any one of the following aqueous dispersions is prepared: (1) an aqueous dispersion composed of 12.5 to 45% by mass of a molten fluorocarbon resin powder with an average particle size of 0.01 to 1 μm, 12.5 to 45% by mass of a hexagonal boron nitride powder with an average particle size of 0.01 to 1 μm, 0.01 to 13.5% by mass of a surfactant, and the balance of 25 to 45% by mass of water, (2) an aqueous dispersion composed of 12.5 to 45% by mass of a molten fluorocarbon resin powder with an average particle size of 0.01 to 1 μm, 12.5 to 45% by mass of a hexagonal boron nitride powder with an average particle size of 0.01 to 1 μm, 0.5 to 8% by mass of a graphite powder, 0.01 to 13.5% by mass of a surfactant, and the balance of 25 to 45% by mass of water, (3) an aqueous dispersion in which 0.1 to 22.5% by mass of an aqueous organic solvent is contained in the aqueous dispersion in (1) above; and (4) an aqueous dispersion in which 0.1 to 22.5% by mass of an aqueous organic solvent is contained in the aqueous dispersion in (2) above.

Figure 10:
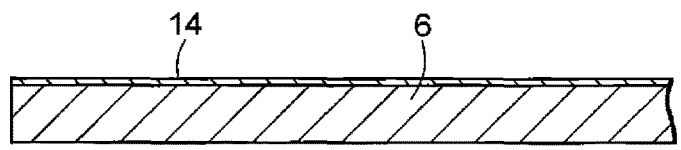
FIG. 10 is a cross-sectional view of the heat-resistant material having a coating layer of a solid lubricant in the process of manufacturing the spherical annular seal member in accordance with the present invention.

(Seventh Process) One of the aforementioned aqueous dispersions (1) to (4) is applied to one surface of the heat-resistant material 6 shown in FIG. 9 by means of brushing, roller coating, spraying, or the like, and this coating layer is dried at a temperature of 100° C., thereby forming a coating layer 14 of the solid lubricant composed of the lubricating composition, as shown in FIG. 10.

(Eighth Process) The heat-resistant material 6 having the coating layer 14 of the solid lubricant composed of the lubricating composition formed on one surface thereof is sintered in a heating furnace at a temperature in a range of the melting point (T) of the molten fluorocarbon resin to (T+150° C.), preferably (T+5° C.) to (T+135° C.), more preferably (T+10° C.) to (T+125° C.), thereby forming a sintered coating layer 15 of the solid lubricant on the one surface of the heat-resistant material 6.

(Ninth Process)

Figure 11:
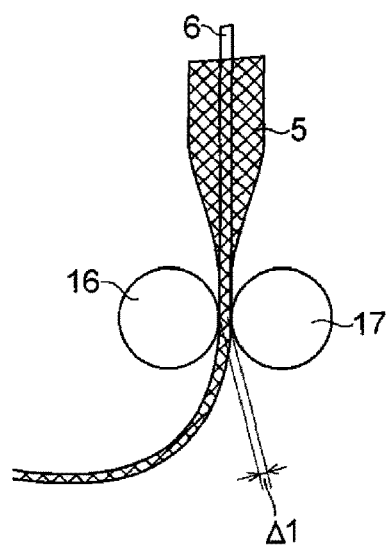
FIG. 11 is a diagram explaining a first method of forming an outer-layer forming member in the process of manufacturing the spherical annular seal member in accordance with the present invention.
Figure 12:
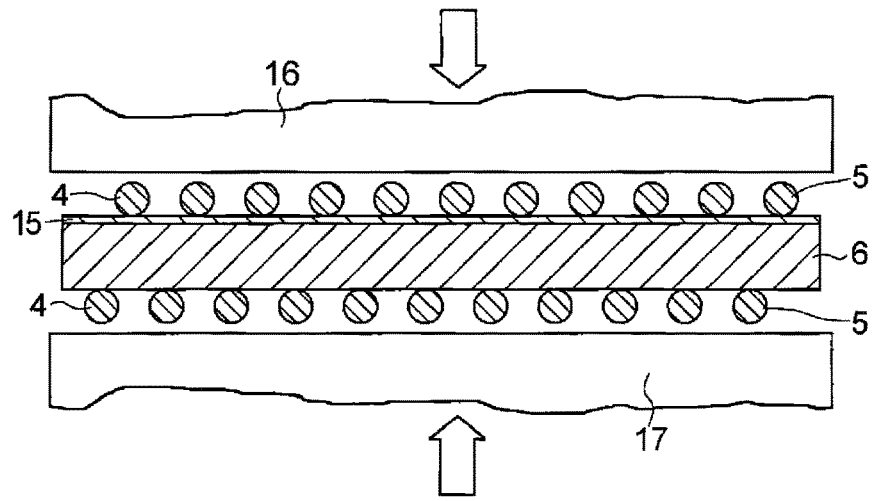
FIG. 12 is a diagram explaining the first method of forming the outer-layer forming member in the process of manufacturing the spherical annular seal member in accordance with the present invention.
Figure 13:
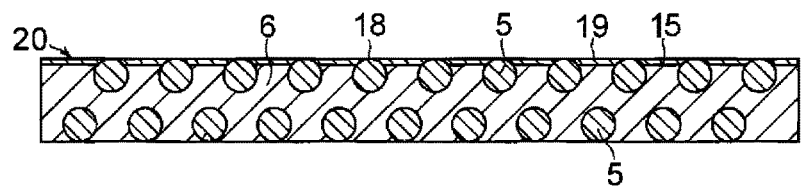
FIG. 13 is a vertical cross-sectional view of the outer-layer forming member which is obtained by the first forming method in the process of manufacturing the spherical annular seal member in accordance with the present invention.

<First Method> As shown in FIGS. 11 to 13, the heat-resistant material 6 having the sintered coating layer 15 of the solid lubricant is continuously inserted (see FIG. 11) into the reinforcing member 5 for the outer layer constituted by the hollow cylindrical knitted metal wire net obtained by continuously knitting a fine metal wire with a wire diameter of 0.28 to 0.32 mm by a knitting machine (not shown). The reinforcing member 5 with the heat-resistant material 6 inserted therein is fed, starting with its insertion start end side, into a nip Δ1 between a pair of cylindrical rollers 16 and 17 each having a smooth cylindrical outer peripheral surface, so as to be integrated by being pressurized in the thicknesswise direction of the heat-resistant material 6 (see FIG. 12), thereby filling the meshes of the metal wire net of the reinforcing member 5 for the outer layer with the heat-resistant material 6 and the sintered coating layer 15 of the solid lubricant formed on the surface of that heat-resistant material 6. Thus, a flattened outer-layer forming member 20 is fabricated on the surface of which a surface 18 constituted by the reinforcing member 5 for the outer layer and a surface 19 constituted by the sintered solid lubricant are exposed in mixed form.

Figure 14:
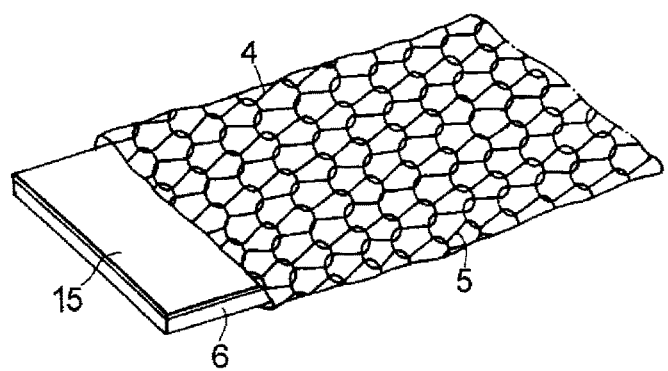
FIG. 14 is a diagram explaining a second method of forming the outer-layer forming member in the process of manufacturing the spherical annular seal member in accordance with the present invention.
Figure 15:
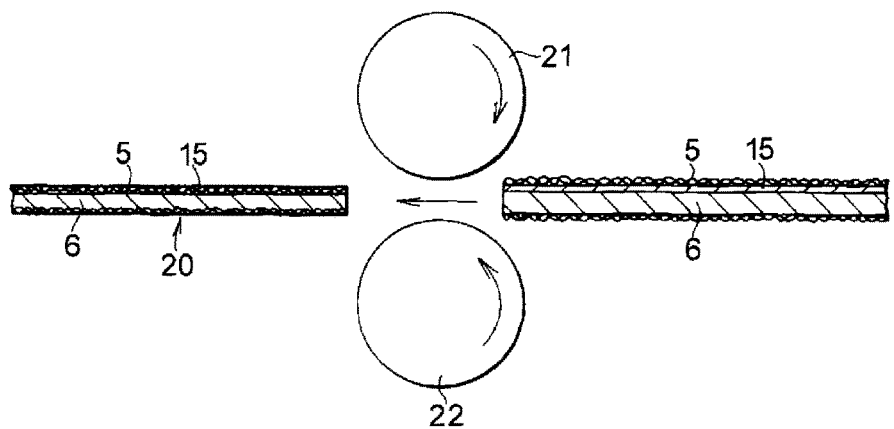
FIG. 15 is a diagram explaining the second method of forming the outer-layer forming member in the process of manufacturing the spherical annular seal member in accordance with the present invention.

<Second Method> The reinforcing member 5 constituted by the belt-shaped metal wire net 4 described in the above-described first process is separately prepared, and, as shown in FIG. 14, the heat-resistant material 6 having the sintered coating layer 15 of the solid lubricant is inserted into the reinforcing member 5 for the outer layer constituted by the belt-shaped metal wire net 4, and, as shown in FIG. 15, this assembly is fed into a nip Al between rollers 21 and 22 so as to be integrated by being pressurized in the thicknesswise direction of the heat-resistant material 6, thereby filling the meshes of the metal wire net of the reinforcing member 5 for the outer layer with the heat-resistant material 6 and the sintered coating layer 15 of the solid lubricant formed on the surface of that heat-resistant material 6. Thus, the flattened outer-layer forming member 20 is fabricated on the surface of which a surface 18 constituted by the reinforcing member 5 for the outer layer and a surface 19 constituted by the sintered solid lubricant are exposed in mixed form.

<Third Method (Not Shown)> A plain woven metal wire net is prepared as a woven metal wire net which is formed by weaving a fine metal wire with a diameter of 0.28 to 0.32 mm The reinforcing member 5 for the outer layer made from this plain woven metal wire net is cut to a predetermined length and width, and two of these reinforcing members 5 are prepared. The heat-resistant material 6 having the sintered coating layer 15 of the solid lubricant is inserted between the two reinforcing members 5 for the outer layer, and this assembly is fed into the nip Δ1 between the pair of rollers 21 and 22 so as to be integrated by being pressurized in the thicknesswise direction of the heat-resistant material 6, thereby filling the meshes of the metal wire net of the reinforcing member 5 for the outer layer with the heat-resistant material 6 and the sintered coating layer 15 of the solid lubricant formed on the surface of that heat-resistant material 6. Thus, the flattened outer-layer forming member 20 is fabricated on the surface of which a surface 18 constituted by the reinforcing member 5 for the outer layer and a surface 19 constituted by the sintered solid lubricant are exposed in mixed form.

In the above-described first, second, and third methods, 0.4 to 0 6 mm or thereabouts is suitable as the nip Δ1 between the pair of cylindrical rollers 16 and 17 and the rollers 21 and 22.

Figure 16:
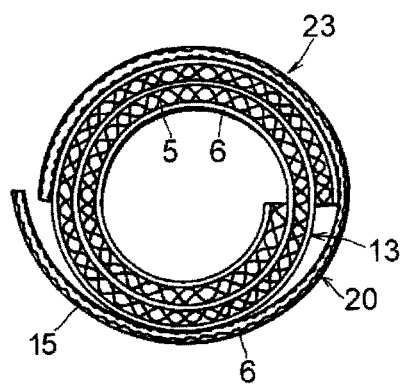
FIG. 16 is a plan view of a cylindrical preform in the process of manufacturing the spherical annular seal member in accordance with the present invention.

(10th Process) The outer-layer forming member 20 thus obtained is wound around an outer peripheral surface of the tubular base member 13 with its sintered coating layer 15 placed on the outer side, thereby preparing a cylindrical preform 23 (see FIG. 16)

Figure 17:
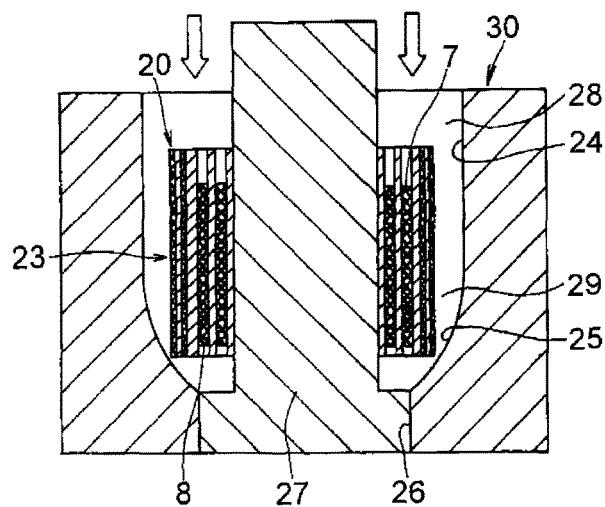
FIG. 17 is a cross-sectional view illustrating a state in which the cylindrical preform is inserted in a die in the process of manufacturing the spherical annular seal member in accordance with the present invention.

(11th Process) A die 30 such as the one shown in FIG. 17 is prepared which has on its inner surface a cylindrical wall surface 24, a partially concave spherical wall surface 25 continuing from the cylindrical wall surface 24, and a through hole 26 continuing from the partially concave spherical wall surface 25, and in which a hollow cylindrical portion 28 and a spherical annular hollow portion 29 continuing from the hollow cylindrical portion 28 are formed inside it as a stepped core 27 is fittingly inserted in the through hole 26. Then, the cylindrical preform 23 is fitted over the stepped core 27 of the die 30.

Figure 2:
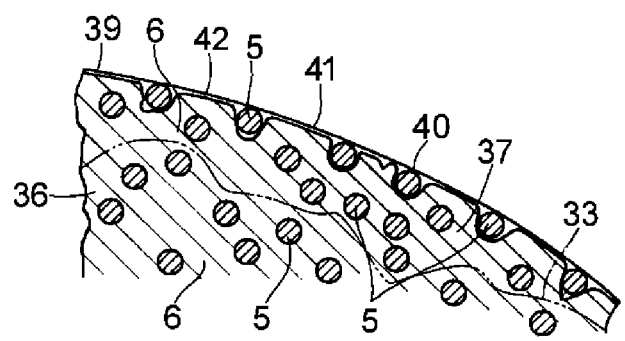
FIG. 2 is a partially enlarged explanatory diagram of the spherical annular seal member shown in FIG. 1.

The cylindrical preform 23 disposed in the hollow cylindrical portion 28 and the spherical annular hollow portion 29 of the die 30 is subjected to compression forming under a pressure of 98 to 294 N/mm² (1 to 3 tons/cm²) in the direction of the core axis. Thus, the spherical annular seal member 38 is fabricated which includes a spherical annular base member 36 having a through hole 31 in its central portion and defined by a cylindrical inner surface 32, the partially convex spherical surface 33, and large- and small-diameter side annular end faces 34 and 35 of the partially convex spherical surface 33, as well as an outer layer 37 formed integrally on the partially convex spherical surface 33 of the spherical annular base member 36, as shown in FIGS. 1 and 2.

By means of this compression forming, the spherical annular base member 36 is constructed so as to be provided with structural integrity as the heat-resistant material 6 and the reinforcing member 5 are compressed to each other and intertwined with each other. In the outer layer 37, the heat-resistant material 6, the sintered solid lubricant constituted by the lubricating composition, and the reinforcing member 5 made from the metal wire net are compressed such that the sintered solid lubricant and the heat-resistant material 6 are filled in the meshes of the metal wire net of the reinforcing member 5, and the solid lubricant, the heat-resistant material 6, and the reinforcing member 5 are integrated in mixed form, an outer surface 39 of that outer layer 37 being thus formed into a smooth surface 42 in which a surface 40 constituted by the reinforcing member 5 and a surface 41 constituted by the sintered solid lubricant are present in mixed form.

In the spherical annular base member 36 and the outer layer 37 of the fabricated spherical annular seal member 38, the reinforcing member 5 constituted by the metal wire net is contained at a ratio of 40 to 65% by mass, and the heat-resistant material 6 containing the expanded graphite and the sintered solid lubricant are contained at a ratio of 35 to 60% by mass. The heat-resistant material 6 and the sintered solid lubricant in the spherical annular base member 36 and the outer layer 37 have a density of 1.20 to 2.00 Mg/m³.

In addition, if attention is focused on the outer layer 37 alone, the reinforcing member 5 constituted by the metal wire net is contained at a ratio of 60 to 75% by mass, and the heat-resistant material 6 containing the expanded graphite and the sintered solid lubricant are contained at a ratio of 25 to 40% by mass in the outer layer 37.

In the above-described fourth process, if the tubular base member 13 is formed by convoluting the superposed assembly 12 in a state in which the reinforcing member 5 constituted by the belt-shaped metal wire net 4 is placed on the inner side, instead of convoluting the superposed assembly 12 with the heat-resistant material 6 placed on the inner side, it is possible to fabricate the spherical annular seal member 38 in which the reinforcing member 5 constituted by the metal wire net is exposed on the cylindrical inner surface 32 of the spherical annular base member 36.

Figure 18:
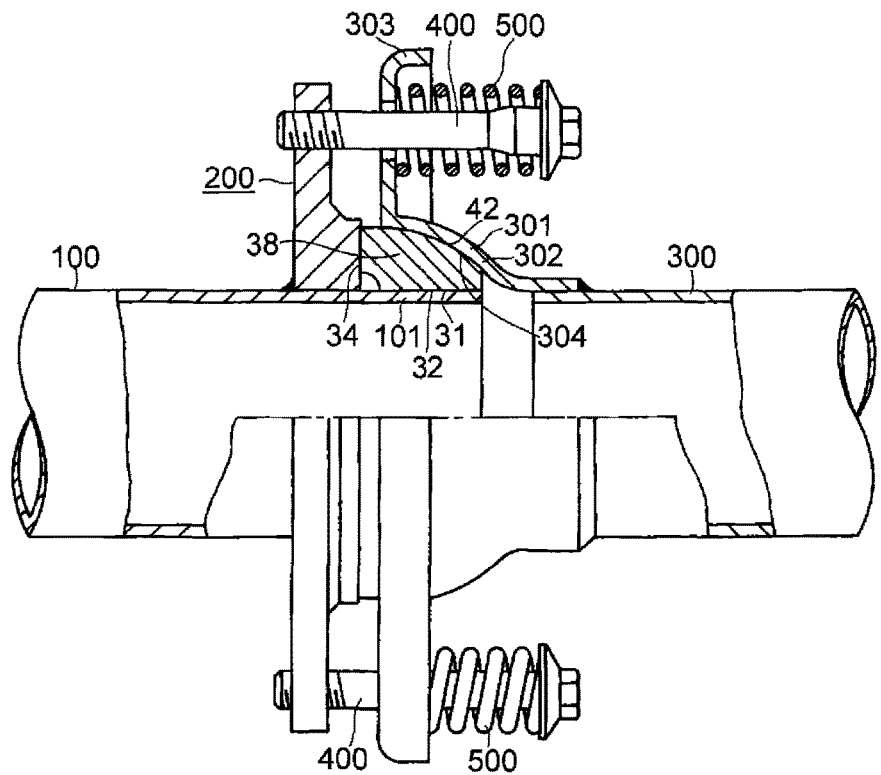
FIG. 18 is a vertical cross-sectional view of an exhaust pipe joint incorporating the spherical annular seal member in accordance with the present invention.
Figure 19:
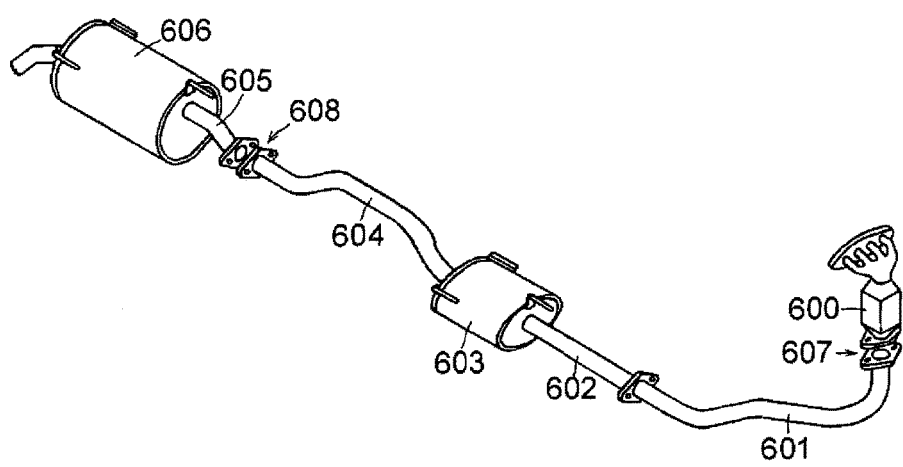
FIG. 19 is an explanatory diagram of an exhaust system of an engine.

The spherical annular seal member 38 is used by being incorporated in the exhaust pipe spherical joint shown in FIG. 18. That is, in the exhaust pipe spherical joint shown in FIG. 18, a flange 200 is provided uprightly on an outer peripheral surface of an upstream-side exhaust pipe 100, which is connected to an engine side, by leaving a pipe end portion 101. The spherical annular seal member 38 is fitted over the pipe end portion 101 at the cylindrical inner surface 32 defining the through hole 31, and is seated with its large-diameter side annular end face 34 abutting against that flange 200. A flared portion 301, which integrally has a concave spherical surface portion 302 and a flange portion 303 continuous from the concave spherical surface portion 302, is secured to a downstream-side exhaust pipe 300 disposed in such a manner as to oppose the upstream-side exhaust pipe 100 and is connected to the muffler side. An inner surface 304 of the concave spherical surface portion 302 is in sliding contact with the smooth surface 42 in which the surface 40 constituted by the reinforcing member 5 and the surface 41 constituted by the sintered solid lubricant are present in mixed form in the outer surface 39 of the outer layer 37 of the spherical annular seal member 38.

In the exhaust pipe spherical joint shown in FIG. 18, the downstream-side exhaust pipe 300 is constantly urged resiliently toward the upstream-side exhaust pipe 100 by means of a pair of bolts 400 each having one end fixed to the flange 200 and another end arranged by being inserted in the flange portion 303 of the flared portion 301, and by means of a pair of coil springs 500 each arranged between an enlarged head of the bolt 400 and the flange portion 303. Further, the exhaust pipe spherical joint is arranged such that relative angular displacements occurring in the upstream- and downstream-side exhaust pipes 100 and 300 are allowed by sliding contact between the smooth surface 42 serving as a sliding surface of the outer layer 37 of the spherical annular seal member 38 and the inner surface 304 of the concave spherical surface portion 302 of the flared portion 301 formed at the end of the downstream-side exhaust pipe 300.

EXAMPLES

Next, the present invention will be described in detail in accordance with examples. It should be noted that the present invention is not limited to these examples.

Examples 1 to 3

By using one austenitic stainless steel wire (SUS 304) having a wire diameter of 0.28 mm as a fine metal wire, a cylindrical knitted metal wire net whose mesh size was 4 mm long and 5 mm wide was fabricated and was passed between a pair of rollers to form a belt-shaped metal wire net. This metal wire net was used as the reinforcing member for the spherical annular base member. As the heat-resistant material, an expanded graphite sheet (heat-resistant material I) having a density of 1.12 Mg/m$^3$ and a thickness of 0.38 mm was used. After the heat-resistant material was convoluted by a one-circumference portion, the reinforcing member for the spherical annular base member was superposed on the inner side of the heat-resistant material, and the superposed assembly thereof was convoluted, thereby preparing a tubular base member in which the heat-resistant material was located on the outermost periphery. In this tubular base member, widthwise opposite end portions of the heat-resistant material respectively projected from the reinforcing member for the spherical annular base member in the widthwise direction thereof.

By using one fine metal wire similar to the above-described one, a cylindrical knitted metal wire net whose mesh size was 3.5 mm long and 1 5 mm wide was fabricated and was passed between the pair of rollers to form a belt-shaped metal wire net. This metal wire net was used as the reinforcing member for the outer layer.

By using a heat-resistant material (heat-resistant material I) similar to the above-described one, a heat-resistant material having a smaller width than the width of the belt-shaped metal wire net of the reinforcing member for the outer layer was prepared separately.

A tetrafluoroethylene-hexafluoropropylene copolymer (FEP) was used as the molten fluorocarbon resin, and an aqueous dispersion was prepared which was composed of 12.5 to 37.5% by mass of an FEP powder with an average particle size of 0.2 μtm, 12.5 to 37.5% by mass of a hexagonal boron nitride powder with an average particle size of 1 μm, 5% by mass of polyoxyenthelene alkyl ether (nonionic surfactant) as a surfactant, and 45% by mass of water.

The above-described aqueous dispersion was roller coated on one surface of the aforementioned separately prepared heat-resistant material, was dried at a temperature of 100° C. to form a coating layer of the solid lubricant constituted by the lubricating composition of FEP and hexagonal boron nitride, and this coated heat-resistant material was then subjected to sintering in a heating furnace at a temperature of 340° C. for 20 minutes, thereby forming a coating layer of the sintered solid lubricant (25 to 75% by mass of FEP and 25 to 75% by mass of hexagonal boron nitride) on the surface of that heat-resistant material.

The heat-resistant material having the coating layer of the sintered solid lubricant was inserted into the belt-shaped metal wire net which is the reinforcing member for the outer layer and was passed between the pair of rollers so as to be integrated, thereby filling the meshes of the metal wire net of the reinforcing member with the heat-resistant material and the coating layer of the sintered solid lubricant on the surface of that heat-resistant material. Thus, a flattened outer-layer forming member was fabricated on the surface of which a surface constituted by the reinforcing member and a surface constituted by the sintered solid lubricant are exposed in mixed form.

The aforementioned outer-layer forming member, in a state in which its surface where the surface constituted by the reinforcing member and the surface constituted by the sintered solid lubricant were present in mixed form on its obverse surface was placed on the outer side, was wound around the outer peripheral surface of the aforementioned tubular base member, thereby preparing a cylindrical preform. This cylindrical preform was fitted over the stepped core of the die shown in FIG. 17, and was disposed in the hollow portion of the die.

The cylindrical preform disposed in the hollow portion of the die was subjected to compression forming at a pressure of 294 N/mm$^3$ (3 tons/cm$^2$) in the direction of the core axis, thereby obtaining a spherical annular seal member which included the spherical annular base member defining the through hole in its central portion and defined by the cylindrical inner surface, the partially convex spherical surface, and the large- and small-diameter side annular end faces of the partially convex spherical surface, as well as the outer layer formed integrally on the partially convex spherical surface of the spherical annular base member.

By means of this compression forming, the spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material made from expanded graphite filling meshes of the metal wire net of this reinforcing member and compressed in such a manner as to be formed integrally with this reinforcing member in mixed form. In the outer layer, the heat-resistant material, the sintered solid lubricant constituted by the lubricating composition containing 25 to 75% by mass of FEP and 25 to 75% by mass of hexagonal boron nitride, and the reinforcing member for the outer layer made from the metal wire net were compressed such that the sintered solid lubricant and the heat-resistant material were filled in the meshes of the metal wire net of the reinforcing member, and such that the solid lubricant, the heat-resistant material, and the reinforcing member were integrated in mixed form, the outer surface of that outer layer being thus formed into a smooth surface in which the surface constituted by the reinforcing member and the surface constituted by the solid lubricant were present in mixed form.

In the spherical annular base member and the outer layer of the fabricated spherical annular seal member, the reinforcing members for the spherical annular base member and the outer layer constituted by the metal wire nets were contained at a ratio of 57.0 to 57.2% by mass, and the heat-resistant material containing the expanded graphite and the solid lubricant were contained at a ratio of 42.8 to 43.0% by mass. The density of the heat-resistant material and the solid lubricant in the spherical annular base member and the outer layer was 1.60 Mg/m$^3$. In addition, as for the outer layer, the reinforcing member constituted by the metal wire net was contained at a ratio of 65.7 to 66.4% by mass, and the heat-resistant material containing the expanded graphite and the solid lubricant were contained at a ratio of 33.6 to 34.3% by mass.

Example 4

By using constituent materials similar to those of Example 1 described above, the tubular base member was fabricated in the same way as in Example 1. In this tubular base member, widthwise opposite end portions of the heat-resistant material respectively projected from the reinforcing member in the widthwise direction thereof.

An expanded graphite sheet similar to that of Example 1 described above was used as the heat-resistant material for the outer layer, and a reinforcing member similar to that of Example 1 described above was used as the reinforcing member for the outer layer.

A tetrafluoroethylene-perfluoroalkylvinylether copolymer (PFA) was used as the molten fluorocarbon resin, and an aqueous dispersion was prepared which was composed of 27.5% by mass of an PFA powder with an average particle size of 0.2 μm, 22.5% by mass of a hexagonal boron nitride powder with an average particle size of 1 μm, 5% by mass of polyoxyenthelene alkyl ether (nonionic surfactant) as a surfactant, and 45% by mass of water.

The above-described aqueous dispersion was roller coated on one surface of the aforementioned separately prepared heat-resistant material, was dried at a temperature of 100° C. to form a coating layer of the solid lubricant constituted by PFA and hexagonal boron nitride, and this coated heat-resistant material was then subjected to sintering in a heating furnace at a temperature of 380° C. for 20 minutes, thereby forming a coating layer of the sintered solid lubricant (55% by mass of PFA and 45% by mass of hexagonal boron nitride) on the surface of that heat-resistant material.

Thereafter, a spherical annular seal member was obtained in a method similar to that of Example 1 described above. In this spherical annular seal member, the spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material made from expanded graphite filling meshes of the metal wire net of this reinforcing member and compressed in such a manner as to be formed integrally with this reinforcing member in mixed form. In the outer layer, the heat-resistant material, the sintered solid lubricant constituted by the lubricating composition containing 55% by mass of PFA and 45% by mass of hexagonal boron nitride, and the reinforcing member for the outer layer made from the metal wire net were compressed such that the sintered solid lubricant and the heat-resistant material were filled in the meshes of the metal wire net of the reinforcing member, and such that the solid lubricant, the heat-resistant material, and the reinforcing member were integrated in mixed form, the outer surface of that outer layer being thus formed into a smooth surface in which the surface constituted by the reinforcing member and the surface constituted by the sintered solid lubricant were present in mixed form.

In the spherical annular base member and the outer layer of the fabricated spherical annular seal member, the reinforcing members for the spherical annular base member and the outer layer constituted by the metal wire nets were contained at a ratio of 57.1% by mass, and the heat-resistant material containing the expanded graphite and the solid lubricant were contained at a ratio of 42.9% by mass. The density of the heat-resistant material and the solid lubricant in the spherical annular base member and the outer layer was 1.61 Mg/m$^3$. In addition, as for the outer layer, the reinforcing member constituted by the metal wire net was contained at a ratio of 65.7% by mass, and the heat-resistant material containing the expanded graphite and the solid lubricant were contained at a ratio of 34.3% by mass.

Examples 5 to 7

By using constituent materials similar to those of Example 1 described above, the tubular base member was fabricated in the same way as in Example 1. In this tubular base member, widthwise opposite end portions of the heat-resistant material respectively projected from the reinforcing member in the widthwise direction thereof.

An expanded graphite sheet similar to that of Example 1 described above was used as the heat-resistant material for the outer layer, and a reinforcing member similar to that of Example 1 described above was used as the reinforcing member for the outer layer.

A tetrafluoroethylene-hexafluoropropylene copolymer (FEP) was used as the molten fluorocarbon resin, and an aqueous dispersion was prepared which was composed of 11.5 to 36.5% by mass of an FEP powder with an average particle size of 0.2 μm, 11.5 to 36.5% by mass of a hexagonal boron nitride powder with an average particle size of 1 μm, 2.0 to 4.5% by mass of a natural graphite powder which passed a sieve of 400 mesh, 5% by mass of polyoxyenthelene alkyl ether (nonionic surfactant) as a surfactant, and 45% by mass of water.

The above-described aqueous dispersion was roller coated on one surface of the aforementioned separately prepared heat-resistant material, was dried at a temperature of 100° C. to form a coating layer of the solid lubricant constituted by the lubricating composition of FEP, hexagonal boron nitride, and graphite, and this coated heat-resistant material was then subjected to sintering in a heating furnace at a temperature of 340° C. for 20 minutes, thereby forming a coating layer of the sintered solid lubricant (23 to 73% by mass of FEP, 23 to 73% by mass of hexagonal boron nitride, and 4 to 9% by mass of graphite) on the surface of that heat-resistant material.

Thereafter, a spherical annular seal member was obtained in a method similar to that of Example 1 described above. In this spherical annular seal member, the spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material made from expanded graphite filling meshes of the metal wire net of this reinforcing member and compressed in such a manner as to be formed integrally with this reinforcing member in mixed form. In the outer layer, the heat-resistant material, the sintered solid lubricant constituted by the lubricating composition containing 23 to 73% by mass of FEP, 23 to 73% by mass of hexagonal boron nitride, and 4 to 9% by mass of graphite, and the reinforcing member for the outer layer made from the metal wire net were compressed such that the sintered solid lubricant and the heat-resistant material were filled in the meshes of the metal wire net of the reinforcing member, and such that the solid lubricant, the heat-resistant material, and the reinforcing member were integrated in mixed form, the outer surface of that outer layer being thus formed into a smooth surface in which the surface constituted by the reinforcing member and the surface constituted by the sintered solid lubricant were present in mixed form.

In the spherical annular base member and the outer layer of the fabricated spherical annular seal member, the reinforcing members for the spherical annular base member and the outer layer constituted by the metal wire nets were contained at a ratio of 56.9 to 57.2% by mass, and the heat-resistant material containing the expanded graphite and the solid lubricant were contained at a ratio of 42.8 to 43.0% by mass. The density of the heat-resistant material and the solid lubricant in the spherical annular base member and the outer layer was 1.62 Mg/m³. In addition, as for the outer layer, the reinforcing member constituted by the metal wire net was contained at a ratio of 65.0 to 65.7% by mass, and the heat-resistant material containing the expanded graphite and the solid lubricant were contained at a ratio of 34.3 to 35.0% by mass.

Example 8

By using constituent materials similar to those of Example 1 described above, the tubular base member was fabricated in the same way as in Example 1. In this tubular base member, widthwise opposite end portions of the heat-resistant material respectively projected from the reinforcing member in the widthwise direction thereof.

An expanded graphite sheet similar to that of Example 1 described above was used as the heat-resistant material for the outer layer, and a reinforcing member similar to that of Example 1 described above was used as the reinforcing member for the outer layer.

A tetrafluoroethylene-hexafluoropropylene copolymer (FEP) was used as the molten fluorocarbon resin, and an aqueous dispersion was prepared which was composed of 27.5% by mass of an FEP powder with an average particle size of 0.2 µm, 22.5% by mass of a hexagonal boron nitride powder with an average particle size of 1 µm, 5% by mass of polyoxyenthelene alkyl ether (nonionic surfactant) as a surfactant, 5% by mass of ethylene glycol as an aqueous organic solvent, and 40% by mass of water.

The above-described aqueous dispersion was roller coated on one surface of the aforementioned separately prepared heat-resistant material, was dried at a temperature of 100° C. to form a coating layer of the solid lubricant constituted by the lubricating composition of FEP and hexagonal boron nitride, and this coated heat-resistant material was then subjected to sintering in a heating furnace at a temperature of 340° C. for 20 minutes, thereby forming a coating layer of the sintered solid lubricant (55% by mass of FEP and 45% by mass of hexagonal boron nitride) on the surface of that heat-resistant material.

Thereafter, a spherical annular seal member was obtained in a method similar to that of Example 1 described above. In this spherical annular seal member, the spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material made from expanded graphite filling meshes of the metal wire net of this reinforcing member and compressed in such a manner as to be formed integrally with this reinforcing member in mixed form. In the outer layer, the heat-resistant material, the sintered solid lubricant constituted by the lubricating composition containing 55% by mass of FEP and 45% by mass of hexagonal boron nitride, and the reinforcing member for the outer layer made from the metal wire net were compressed such that the sintered solid lubricant and the heat-resistant material were filled in the meshes of the metal wire net of the reinforcing member, and such that the solid lubricant, the heat-resistant material, and the reinforcing member were integrated in mixed form, the outer surface of that outer layer being thus formed into a smooth surface in which the surface consti-tuted by the reinforcing member and the surface constituted by the sintered solid lubricant were present in mixed form.

In the spherical annular base member and the outer layer of the fabricated spherical annular seal member, the reinforcing members for the spherical annular base member and the outer layer constituted by the metal wire nets were contained at a ratio of 57.2% by mass, and the heat-resistant material containing the expanded graphite and the solid lubricant were contained at a ratio of 42.8% by mass. The density of the heat-resistant material and the solid lubricant in the spherical annular base member and the outer layer was 1.60 Mg/m³. In addition, as for the outer layer, the reinforcing member constituted by the metal wire net was contained at a ratio of 65.7% by mass, and the heat-resistant material containing the expanded graphite and the solid lubricant were contained at a ratio of 34.3% by mass.

Example 9

By using constituent materials similar to those of Example 1 described above, the tubular base member was fabricated in the same way as in Example 1. In this tubular base member, widthwise opposite end portions of the heat-resistant material respectively projected from the reinforcing member in the widthwise direction thereof.

An expanded graphite sheet similar to that of Example 1 described above was used as the heat-resistant material for the outer layer, and a reinforcing member similar to that of Example 1 described above was used as the reinforcing member for the outer layer.

A tetrafluoroethylene-hexafluoropropylene copolymer (FEP) was used as the molten fluorocarbon resin, and an aqueous dispersion was prepared which was composed of 25% by mass of an FEP powder with an average particle size of 0.2 µm, 20.5% by mass of a hexagonal boron nitride powder with an average particle size of 1 µm, 4.5% by mass of a natural graphite powder which passed a sieve of 400 mesh, 5% by mass of polyoxyenthelene alkyl ether (nonionic surfactant) as a surfactant, 5% by mass of ethylene glycol as an aqueous organic solvent, and 40% by mass of water.

The above-described aqueous dispersion was roller coated on one surface of the aforementioned separately prepared heat-resistant material, was dried at a temperature of 100° C. to form a coating layer of the solid lubricant constituted by the lubricating composition of FEP, hexagonal boron nitride, and graphite, and this coated heat-resistant material was then subjected to sintering in a heating furnace at a temperature of 340° C. for 20 minutes, thereby forming a coating layer of the sintered solid lubricant (50% by mass of FEP, 41% by mass of hexagonal boron nitride, and 9% by mass of graphite) on the surface of that heat-resistant material.

Thereafter, a spherical annular seal member was obtained in a method similar to that of Example 1 described above. In this spherical annular seal member, the spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material made from expanded graphite filling meshes of the metal wire net of this reinforcing member and compressed in such a manner as to be formed integrally with this reinforcing member in mixed form. In the outer layer, the heat-resistant material, the sintered solid lubricant constituted by the lubricating composition containing 50% by mass of FEP, 41% by mass of hexagonal boron nitride, and 9% by mass of graphite, and the reinforcing member for the outer layer made from the metal wire net were compressed such that the sintered solid lubricant and the heat-resistant material were filled in the meshes of the metal wire net of the reinforcing member, and such that the solid lubricant, the heat-resistant material, and the reinforcing member were integrated in mixed form, the outer surface of that outer layer being thus formed into a smooth surface in which the surface constituted by the reinforcing member and the surface constituted by the sintered solid lubricant were present in mixed form.

In the spherical annular base member and the outer layer of the fabricated spherical annular seal member, the reinforcing members for the spherical annular base member and the outer layer constituted by the metal wire nets were contained at a ratio of 57.1% by mass, and the heat-resistant material containing the expanded graphite and the solid lubricant were contained at a ratio of 42.9% by mass. The density of the heat-resistant material and the solid lubricant in the spherical annular base member and the outer layer was 1.61 Mg/m$^3$. In addition, as for the outer layer, the reinforcing member constituted by the metal wire net was contained at a ratio of 65.7% by mass, and the heat-resistant material containing the expanded graphite and the solid lubricant were contained at a ratio of 34.3% by mass.

Example 10

A reinforcing member for the spherical annular base member similar to that of Example 1 described above was used. An expanded graphite sheet (heat-resistant material II) containing 4.0% by mass of aluminum primary phosphate and having a density of 1.12 Mg/m$^3$ and a thickness of 0.38 mm was used as the heat-resistant material. Thereafter, the tubular base member was fabricated in the same way as in Example 1. In this tubular base member, widthwise opposite end portions of the heat-resistant material respectively projected from the reinforcing member for the spherical annular base member in the widthwise direction thereof.

A reinforcing member similar to that of Example 1 described above was used as the reinforcing member for the outer layer. An expanded graphite sheet (heat-resistant material II) similar to the heat-resistant material for the spherical annular base member (heat-resistant material II) was separately prepared as the heat-resistant material for the outer layer.

A tetrafluoroethylene-hexafluoropropylene copolymer (FEP) was used as the molten fluorocarbon resin, and an aqueous dispersion was prepared which was composed of 27.5% by mass of an FEP powder with an average particle size of 0.2 μm, 22.5% by mass of a hexagonal boron nitride powder with an average particle size of 1 μm, 5% by mass of polyoxyenthelene alkyl ether (nonionic surfactant) as a surfactant, and 45% by mass of water.

The above-described aqueous dispersion was roller coated on one surface of the aforementioned separately prepared heat-resistant material (heat-resistant material II), was dried at a temperature of 100° C.° to form a coating layer of the solid lubricant constituted by the lubricating composition of FEP and hexagonal boron nitride, and this coated heat-resistant material was then subjected to sintering in a heating furnace at a temperature of 340° C. for 20 minutes, thereby forming a coating layer of the sintered solid lubricant (55% by mass of FEP and 45% by mass of hexagonal boron nitride) on the surface of that heat-resistant material.

Thereafter, a spherical annular seal member was obtained in a method similar to that of Example 1 described above. In this spherical annular seal member, the spherical annular base member was constructed so as to be provided with structural integrity as the heat-resistant material (heat-resistant material II) and the reinforcing member for the spherical annular base member made from the metal wire net were compressed and intertwined with each other. The spherical annular base member included the reinforcing member for the spherical annular base member made from the compressed metal wire net and the heat-resistant material made from expanded graphite filling meshes of the metal wire net of this reinforcing member and compressed in such a manner as to be formed integrally with this reinforcing member in mixed form. In the outer layer, the heat-resistant material (heat-resistant material II), the sintered solid lubricant constituted by the lubricating composition containing 55% by mass of FEP and 45% by mass of hexagonal boron nitride, and the reinforcing member for the outer layer made from the metal wire net were compressed such that the sintered solid lubricant and the heat-resistant material were filled in the meshes of the metal wire net of the reinforcing member, and such that the solid lubricant, the heat-resistant material, and the reinforcing member were integrated in mixed form, the outer surface of that outer layer being thus formed into a smooth surface in which the surface constituted by the reinforcing member and the surface constituted by the sintered solid lubricant were present in mixed form.

In the spherical annular base member and the outer layer of the fabricated spherical annular seal member, the reinforcing members for the spherical annular base member and the outer layer constituted by the metal wire nets were contained at a ratio of 57.3% by mass, and the heat-resistant material containing the expanded graphite and the solid lubricant were contained at a ratio of 42.7% by mass. The density of the heat-resistant material and the solid lubricant in the spherical annular base member and the outer layer was 1.60 Mg/m$^3$. In addition, as for the outer layer, the reinforcing member constituted by the metal wire net was contained at a ratio of 65.8% by mass, and the heat-resistant material containing the expanded graphite and the solid lubricant were contained at a ratio of 34.2% by mass.

Example 11

A reinforcing member for the spherical annular base member similar to that of Example 1 described above was used. An expanded graphite sheet (heat-resistant material III) containing 8.0% by mass of aluminum primary phosphate and 1.0% by mass of phosphorus pentoxide and having a density of 1.12 Mg/m$^3$ and a thickness of 0.38 mm was used as the heat-resistant material. Thereafter, the tubular base member was fabricated in the same way as in Example 1. In this tubular base member, widthwise opposite end portions of the heat-resistant material respectively projected from the reinforcing member for the spherical annular base member in the widthwise direction thereof.

A reinforcing member similar to that of Example 1 described above was used as the reinforcing member for the outer layer. An expanded graphite sheet for the spherical annular base member (heat-resistant material III) was separately prepared as the heat-resistant material for the outer layer.

A tetrafluoroethylene-hexafluoropropylene copolymer (FEP) was used as the molten fluorocarbon resin, and an aqueous dispersion was prepared which was composed of 27.5% by mass of an FEP powder with an average particle size of 0.2 μm, 22.5% by mass of a hexagonal boron nitride powder with an average particle size of 1 μm, 5% by mass of polyoxyenthelene alkyl ether (nonionic surfactant) as a surfactant, and 45% by mass of water.

The above-described aqueous dispersion was roller coated on one surface of the aforementioned separately prepared heat-resistant material (heat-resistant material III), was dried at a temperature of 100° C. to form a coating layer of the solid lubricant constituted by the lubricating composition of FEP and hexagonal boron nitride, and this coated heat-resistant material was then subjected to sintering in a heating furnace at a temperature of 340° C. for 20 minutes, thereby forming a coating layer of the sintered solid lubricant (55% by mass of FEP and 45% by mass of hexagonal boron nitride) on the surface of that heat-resistant material.

Thereafter, a spherical annular seal member was obtained in a method similar to that of Example 1 described above. In this spherical annular seal member, the spherical annular base member was constructed so as to be provided with structural integrity as the heat-resistant material (heat-resistant material III) and the reinforcing member for the spherical annular base member made from the metal wire net were compressed and intertwined with each other. The spherical annular base member included the reinforcing member for the spherical annular base member made from the compressed metal wire net and the heat-resistant material made from expanded graphite filling meshes of the metal wire net of this reinforcing member and compressed in such a manner as to be formed integrally with this reinforcing member in mixed form. In the outer layer, the heat-resistant material (heat-resistant material III), the sintered solid lubricant constituted by the lubricating composition containing 55% by mass of FEP and 45% by mass of hexagonal boron nitride, and the reinforcing member for the outer layer made from the metal wire net were compressed such that the sintered solid lubricant and the heat-resistant material were filled in the meshes of the metal wire net of the reinforcing member, and such that the solid lubricant, the heat-resistant material, and the reinforcing member were integrated in mixed form, the outer surface of that outer layer being thus formed into a smooth surface in which the surface constituted by the reinforcing member and the surface constituted by the sintered solid lubricant were present in mixed form.

In the spherical annular base member and the outer layer of the fabricated spherical annular seal member, the reinforcing members for the spherical annular base member and the outer layer constituted by the metal wire nets were contained at a ratio of 57.2% by mass, and the heat-resistant material containing the expanded graphite and the solid lubricant were contained at a ratio of 42.8% by mass. The density of the heat-resistant material and the solid lubricant in the spherical annular base member and the outer layer was 1.62 Mg/m$^3$. In addition, as for the outer layer, the reinforcing member constituted by the metal wire net was contained at a ratio of 65.5% by mass, and the heat-resistant material containing the expanded graphite and the solid lubricant were contained at a ratio of 34.5% by mass.

Example 12

By using constituent materials similar to those of Example 10 described above, the tubular base member was fabricated in a similar method to that of Example 1. In this tubular base member, widthwise opposite end portions of the heat-resistant material respectively projected from the reinforcing member for the spherical annular base member in the widthwise direction thereof.

A reinforcing member similar to that of Example 1 described above was used as the reinforcing member for the outer layer. An expanded graphite sheet (heat-resistant material II) similar to the heat-resistant material for the spherical annular base member (heat-resistant material II) was separately prepared as the heat-resistant material for the outer layer.

An aqueous dispersion similar to that of Example 8 described above was prepared as the aqueous dispersion.

The above-described aqueous dispersion was roller coated on one surface of the aforementioned separately prepared heat-resistant material (heat-resistant material II), was dried at a temperature of 100° C. to form a coating layer of the solid lubricant constituted by the lubricating composition of FEP and hexagonal boron nitride, and this coated heat-resistant material was then subjected to sintering in a heating furnace at a temperature of 340° C. for 20 minutes, thereby forming a coating layer of the sintered solid lubricant (55% by mass of FEP and 45% by mass of hexagonal boron nitride) on the surface of that heat-resistant material.

Thereafter, a spherical annular seal member was obtained in a method similar to that of Example 1 described above. In this spherical annular seal member, the spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material made from expanded graphite filling meshes of the metal wire net of this reinforcing member and compressed in such a manner as to be formed integrally with this reinforcing member in mixed form. In the outer layer, the heat-resistant material, the sintered solid lubricant constituted by the lubricating composition containing 55% by mass of FEP and 45% by mass of hexagonal boron nitride, and the reinforcing member for the outer layer made from the metal wire net were compressed such that the sintered solid lubricant and the heat-resistant material were filled in the meshes of the metal wire net of the reinforcing member, and such that the solid lubricant, the heat-resistant material, and the reinforcing member were integrated in mixed form, the outer surface of that outer layer being thus formed into a smooth surface in which the surface constituted by the reinforcing member and the surface constituted by the sintered solid lubricant were present in mixed form.

In the spherical annular base member and the outer layer of the fabricated spherical annular seal member, the reinforcing members for the spherical annular base member and the outer layer constituted by the metal wire nets were contained at a ratio of 57.4% by mass, and the heat-resistant material containing the expanded graphite and the solid lubricant were contained at a ratio of 42.6% by mass. The density of the heat-resistant material and the solid lubricant in the spherical annular base member and the outer layer was 1.61 Mg/m$^3$. In addition, as for the outer layer, the reinforcing member constituted by the metal wire net was contained at a ratio of 65.9% by mass, and the heat-resistant material containing the expanded graphite and the solid lubricant were contained at a ratio of 34.1% by mass.

Example 13

By using constituent materials similar to those of Example 10 described above, the tubular base member was fabricated in a similar method to that of Example 1. In this tubular base member, widthwise opposite end portions of the heat-resistant material respectively projected from the reinforcing member for the spherical annular base member in the widthwise direction thereof.

A reinforcing member similar to that of Example 1 described above was used as the reinforcing member for the outer layer. An expanded graphite sheet (heat-resistant material II) similar to the heat-resistant material for the spherical annular base member (heat-resistant material II) was separately prepared as the heat-resistant material for the outer layer.

An aqueous dispersion similar to that of Example 9 described above was prepared as the aqueous dispersion.

The above-described aqueous dispersion was roller coated on one surface of the aforementioned separately prepared heat-resistant material (heat-resistant material II), was dried at a temperature of 100° C. to form a coating layer of the solid lubricant constituted by the lubricating composition of FEP, hexagonal boron nitride, and graphite, and this coated heat-resistant material was then subjected to sintering in a heating furnace at a temperature of 340° C. for 20 minutes, thereby forming a coating layer of the sintered solid lubricant (50% by mass of FEP, 41% by mass of hexagonal boron nitride, and 9% by mass of graphite) on the surface of that heat-resistant material.

Thereafter, a spherical annular seal member was obtained in a method similar to that of Example 1 described above. In this spherical annular seal member, the spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material made from expanded graphite filling meshes of the metal wire net of this reinforcing member and compressed in such a manner as to be formed integrally with this reinforcing member in mixed form. In the outer layer, the heat-resistant material, the sintered solid lubricant constituted by the lubricating composition containing 50% by mass of FEP, 41% by mass of hexagonal boron nitride, and 9% by mass of graphite, and the reinforcing member for the outer layer made from the metal wire net were compressed such that the sintered solid lubricant and the heat-resistant material were filled in the meshes of the metal wire net of the reinforcing member, and such that the solid lubricant, the heat-resistant material, and the reinforcing member were integrated in mixed form, the outer surface of that outer layer being thus formed into a smooth surface in which the surface constituted by the reinforcing member and the surface constituted by the sintered solid lubricant were present in mixed form.

In the spherical annular base member and the outer layer of the fabricated spherical annular seal member, the reinforcing members for the spherical annular base member and the outer layer constituted by the metal wire nets were contained at a ratio of 57.2% by mass, and the heat-resistant material containing the expanded graphite and the solid lubricant were contained at a ratio of 42.8% by mass. The density of the heat-resistant material and the solid lubricant in the spherical annular base member and the outer layer was 1.60 Mg/m³. In addition, as for the outer layer, the reinforcing member constituted by the metal wire net was contained at a ratio of 65.7% by mass, and the heat-resistant material containing the expanded graphite and the solid lubricant were contained at a ratio of 34.3% by mass.

Example 14

By using constituent materials similar to those of Example 11 described above, the tubular base member was fabricated in a similar method to that of Example 1. In this tubular base member, widthwise opposite end portions of the heat-resistant material respectively projected from the reinforcing member in the widthwise direction thereof.

A reinforcing member similar to that of Example 1 described above was used as the reinforcing member for the outer layer. An expanded graphite sheet for the spherical annular base member (heat-resistant material III) was separately prepared as the heat-resistant material for the outer layer.

An aqueous dispersion similar to that of Example 8 described above was prepared as the aqueous dispersion.

The above-described aqueous dispersion was roller coated on one surface of the aforementioned separately prepared heat-resistant material (heat-resistant material III), was dried at a temperature of 100° C. to form a coating layer of the solid lubricant constituted by the lubricating composition of FEP and hexagonal boron nitride, and this coated heat-resistant material was then subjected to sintering in a heating furnace at a temperature of 340° C. for 20 minutes, thereby forming a coating layer of the sintered solid lubricant (55% by mass of FEP and 45% by mass of hexagonal boron nitride) on the surface of that heat-resistant material.

Thereafter, a spherical annular seal member was obtained in a method similar to that of Example 1 described above. In this spherical annular seal member, the spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material made from expanded graphite filling meshes of the metal wire net of this reinforcing member and compressed in such a manner as to be formed integrally with this reinforcing member in mixed form. In the outer layer, the heat-resistant material, the sintered solid lubricant constituted by the lubricating composition containing 55% by mass of FEP and 45% by mass of hexagonal boron nitride, and the reinforcing member for the outer layer made from the metal wire net were compressed such that the sintered solid lubricant and the heat-resistant material were filled in the meshes of the metal wire net of the reinforcing member, and such that the solid lubricant, the heat-resistant material, and the reinforcing member were integrated in mixed form, the outer surface of that outer layer being thus formed into a smooth surface in which the surface constituted by the reinforcing member and the surface constituted by the sintered solid lubricant were present in mixed form.

In the spherical annular base member and the outer layer of the fabricated spherical annular seal member, the reinforcing members for the spherical annular base member and the outer layer constituted by the metal wire nets were contained at a ratio of 57.0% by mass, and the heat-resistant material containing the expanded graphite and the solid lubricant were contained at a ratio of 43.0% by mass. The density of the heat-resistant material and the solid lubricant in the spherical annular base member and the outer layer was 1.60 Mg/m³. In addition, as for the outer layer, the reinforcing member constituted by the metal wire net was contained at a ratio of 65.7% by mass, and the heat-resistant material containing the expanded graphite and the solid lubricant were contained at a ratio of 34.3% by mass.

Example 15

By using constituent materials similar to those of Example 11, the tubular base member was fabricated in a similar method to that of Example 1.

A reinforcing member similar to that of Example 1 described above was used as the reinforcing member for the outer layer. An expanded graphite sheet for the spherical annular base member (heat-resistant material III) was separately prepared as the heat-resistant material for the outer layer.

An aqueous dispersion similar to that of Example 9 described above was prepared as the aqueous dispersion.

The above-described aqueous dispersion was roller coated on one surface of the aforementioned separately prepared heat-resistant material (heat-resistant material II), was dried at a temperature of 100° C. to form a coating layer of the solid lubricant constituted by the lubricating composition of FEP, hexagonal boron nitride, and graphite, and this coated heat-resistant material was then subjected to sintering in a heating furnace at a temperature of 340° C. for 20 minutes, thereby forming a coating layer of the sintered solid lubricant (50% by mass of FEP, 41% by mass of hexagonal boron nitride, and 9% by mass of graphite) on the surface of that heat-resistant material.

Thereafter, a spherical annular seal member was obtained in a method similar to that of Example 1 described above. In this spherical annular seal member, the spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material made from expanded graphite filling meshes of the metal wire net of this reinforcing member and compressed in such a manner as to be formed integrally with this reinforcing member in mixed form. In the outer layer, the heat-resistant material, the sintered solid lubricant constituted by the lubricating composition containing 50% by mass of FEP, 41% by mass of hexagonal boron nitride, and 9% by mass of graphite, and the reinforcing member for the outer layer made from the metal wire net were compressed such that the sintered solid lubricant and the heat-resistant material were filled in the meshes of the metal wire net of the reinforcing member, and such that the solid lubricant, the heat-resistant material, and the reinforcing member were integrated in mixed form, the outer surface of that outer layer being thus formed into a smooth surface in which the surface constituted by the reinforcing member and the surface constituted by the sintered solid lubricant were present in mixed form.

In the spherical annular base member and the outer layer of the fabricated spherical annular seal member, the reinforcing members for the spherical annular base member and the outer layer constituted by the metal wire nets were contained at a ratio of 57.6% by mass, and the heat-resistant material containing the expanded graphite and the solid lubricant were contained at a ratio of 42.4% by mass. The density of the heat-resistant material and the solid lubricant in the spherical annular base member and the outer layer was 1.61 Mg/m$^3$. In addition, as for the outer layer, the reinforcing member constituted by the metal wire net was contained at a ratio of 66.2% by mass, and the heat-resistant material containing the expanded graphite and the solid lubricant were contained at a ratio of 33.8% by mass.

Comparative Example 1

By using one austenitic stainless steel wire (SUS 304) having a wire diameter of 0.28 mm as a fine metal wire, a cylindrical knitted metal wire net whose mesh size was 4 mm long and 5 mm wide was fabricated and was passed between a pair of rollers to form a belt-shaped metal wire net. This metal wire net was used as the reinforcing member for the spherical annular base member. As the heat-resistant material, an expanded graphite sheet having a density of 1.12 Mg/m$^3$ and a thickness of 0.38 mm was used. After the heat-resistant material was convoluted by a one-circumference portion, the reinforcing member for the spherical annular base member was superposed on the inner side of the heat-resistant material, and the superposed assembly thereof was convoluted, thereby preparing a tubular base member in which the heat-resistant material was located on the outermost periphery. In this tubular base member, widthwise opposite end portions of the heat-resistant material respectively projected from the reinforcing member for the spherical annular base member in the widthwise direction thereof.

By using one fine metal wire similar to the above-described fine metal wire, a cylindrical knitted metal wire net whose mesh size was 3.5 mm long and 2 5 mm wide was fabricated and was passed between a pair of rollers to form a belt-shaped metal wire net. This metal wire net was used as the reinforcing member for the outer layer. A heat-resistant material similar to the above-described one was separately prepared as the heat-resistant material, and this heat-resistant material was inserted into the belt-shaped metal wire net. A heat-resistant material similar to the one described above was separately prepared, and an aqueous dispersion (solid content: 50%) which was composed of 50% by mass of a polytetrafluoroethylene resin (PTFE), 5% by mass of a surfactant, and 45% by mass of water was roller coated on one surface of that heat-resistant material, and was dried at a temperature of 100° C., thereby forming a coating layer of PTFE.

The heat-resistant material having the coating layer of PTFE was superposed on the belt-shaped metal wire net holding the heat-resistant material in its interior with that coating layer facing upward, and an assembly thereof was passed between a pair of rollers to thereby form an integrated outer-layer forming member.

The above-described outer-layer forming member with its coating layer placed on the outer side was wound around the outer peripheral surface of the above-described tubular base member, thereby preparing a cylindrical preform. Thereafter, by using a die similar to that of the above-described Examples, a spherical annular seal member was obtained by a similar method, and the spherical annular seal member included the spherical annular base member having the through hole in its central portion and defined by the cylindrical inner surface, the partially convex spherical surface, and the large- and small-diameter side annular end faces of the partially convex spherical surface, as well as the outer layer formed integrally on the partially convex spherical surface of the spherical annular base member.

By means of this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member included the reinforcing member for the spherical annular base member made from the compressed metal wire net and the heat-resistant material for the spherical annular base member made from expanded graphite filling meshes of this reinforcing member and compressed in such a manner as to be formed integrally with the reinforcing member in mixed form. The surface of the outer layer included the compressed heat-resistant material, the reinforcing member made from the metal wire net and integrated with this heat-resistant material in mixed form, and the coating layer of PTFE integrated with the reinforcing member and the heat-resistant material, and the outer surface of the outer layer exposed to the outside was formed into a smooth surface of the coating layer of PTFE.

In the spherical annular base member and the outer layer of the fabricated spherical annular seal member, the reinforcing members for the spherical annular base member and the outer layer constituted by the metal wire nets were contained at a ratio of 57.0% by mass, and the heat-resistant material containing the expanded graphite and the solid lubricant were contained at a ratio of 43.0% by mass. The density of the heat-resistant material and the solid lubricant in the spherical annular base member and the outer layer was 1.58 Mg/m$^3$. In addition, as for the outer layer, the reinforcing member constituted by the metal wire net was contained at a ratio of 66.2% by mass, and the heat-resistant material containing the expanded graphite and the solid lubricant were contained at a ratio of 33.8% by mass.

Comparative Example 2

A tubular base member was fabricated by materials and a method similar to those of Comparative Example 1 described above. In the same way as Comparative Example 1 described above, a belt-shaped metal wire net with a heat-resistant material inserted and held in its interior was fabricated, and this was used as the reinforcing member for the outer layer. A heat-resistant material similar to the one described above was separately prepared, and an aqueous dispersion (solid content: 50%) which was composed of 50% by mass of a polytetrafluoroethylene resin (PTFE), 5% by mass of a surfactant, and 45% by mass of water was roller coated on one surface of that heat-resistant material, and was dried at a temperature of 100° C., thereby forming a coating layer of PTFE. Subsequently, this heat-resistant material was sintered in a heating furnace for 20 minutes at a temperature of 340° C. above the melting point (327° C.) of PTFE, to thereby form a sintered coating layer of PTFE on the one surface of the heat-resistant material.

The heat-resistant material having the sintered coating layer of PTFE was superposed on the belt-shaped metal wire net having the heat-resistant material inserted and held in its interior with that coating layer facing upward, and an assembly thereof was passed between a pair of rollers to thereby form an integrated outer-layer forming member.

The above-described outer-layer forming member with its coating layer placed on the outer side was wound around the outer peripheral surface of the above-described tubular base member, thereby preparing a cylindrical preform. Thereafter, by using a die similar to that of the above-described Examples, a spherical annular seal member was obtained by a similar method, and the spherical annular seal member included the spherical annular base member having the through hole in its central portion and defined by the cylindrical inner surface, the partially convex spherical surface, and the large- and small-diameter side annular end faces of the partially convex spherical surface, as well as the outer layer formed integrally on the partially convex spherical surface of the spherical annular base member.

By means of this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member included the reinforcing member for the spherical annular base member made from the compressed metal wire net and the heat-resistant material for the spherical annular base member made from expanded graphite filling meshes of this reinforcing member and compressed in such a manner as to be formed integrally with the reinforcing member in mixed form. The surface of the outer layer included the compressed heat-resistant material, the reinforcing member made from the metal wire net and integrated with this heat-resistant material in mixed form, and the sintered coating layer of PTFE integrated with the reinforcing member and the heat-resistant material, and the outer surface of the outer layer exposed to the outside was formed into a smooth surface of the sintered coating layer of PTFE.

In the spherical annular base member and the outer layer of the fabricated spherical annular seal member, the reinforcing members for the spherical annular base member and the outer layer constituted by the metal wire nets were contained at a ratio of 57.2% by mass, and the heat-resistant material containing the expanded graphite and the solid lubricant were contained at a ratio of 42.8% by mass. The density of the heat-resistant material and the solid lubricant in the spherical annular base member and the outer layer was 1.58 Mg/m$^3$. In addition, as for the outer layer, the reinforcing member constituted by the metal wire net was contained at a ratio of 66.1% by mass, and the heat-resistant material containing the expanded graphite and the solid lubricant were contained at a ratio of 33.9% by mass.

Comparative Example 3

A tubular base member was fabricated by materials and a method similar to those of Comparative Example 1 described above. In the same way as Comparative Example 1 described above, a belt-shaped metal wire net with a heat-resistant material inserted and held in its interior was fabricated, and this was used as the reinforcing member for the outer layer.

A heat-resistant material similar to that of Comparative Example 1 described above was separately prepared, and an aqueous dispersion (18.7% by mass of hexagonal boron nitride, 33.0% by mass of PTFE, 3.3% by mass of alumina, 5% by mass of a surfactant, and 40% by mass of water), which dispersedly contained as a solid content 55% by mass of a lubricating composition (34% by mass of hexagonal boron nitride, 60% by mass of PTFE, and 6% by mass of alumina) in which a lubricating composition consisting of 85% by mass of a hexagonal boron nitride powder and 15% by mass of an alumina powder was set as 100 parts by mass and in which 150 parts by mass of a polytetrafluoroethylene resin (PTFE) powder was dispersedly contained, was roller coated on one surface of that heat-resistant material, and was dried at a temperature of 100° C., thereby forming a coating layer of the lubricating composition (34% by mass of hexagonal boron nitride, 60% by mass of PTFE, and 6% by mass of alumina) on one surface of that heat-resistant material.

The heat-resistant material having the coating layer of the lubricating composition was superposed on the belt-shaped metal wire net having the heat-resistant material inserted and held in its interior with that coating layer facing upward, and an assembly thereof was passed between a pair of rollers to thereby form an integrated outer-layer forming member.

The above-described outer-layer forming member with the coating layer of the lubricating composition placed on the outer side was wound around the outer peripheral surface of the above-described tubular base member, thereby preparing a cylindrical preform. Thereafter, by using a die similar to that of the above-described Examples, a spherical annular seal member was obtained by a similar method, and the spherical annular seal member included the spherical annular base member having the through hole in its central portion and defined by the cylindrical inner surface, the partially convex spherical surface, and the large- and small-diameter side annular end faces of the partially convex spherical surface, as well as the outer layer formed integrally on the partially convex spherical surface of the spherical annular base member.

By means of this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member included the reinforcing member for the spherical annular base member made from the compressed metal wire net and the heat-resistant material for the spherical annular base member made from expanded graphite filling meshes of this reinforcing member and compressed in such a manner as to be formed integrally with the reinforcing member in mixed form. The surface of the outer layer included the compressed heat-resistant material, the reinforcing member made from the metal wire net and integrated with this heat-resistant material in mixed form, and the coating layer of the lubricating composition integrated with the reinforcing member and the heat-resistant material, and the outer surface of the outer layer exposed to the outside was formed into a smooth surface of the coating layer of the lubricating composition (34% by mass of hexagonal boron nitride, 60% by mass of PTFE, and 6% by mass of alumina).

In the spherical annular base member and the outer layer of the fabricated spherical annular seal member, the reinforcing members for the spherical annular base member and the outer layer constituted by the metal wire nets were contained at a ratio of 54.7% by mass, and the heat-resistant material containing the expanded graphite and the solid lubricant were contained at a ratio of 45.3% by mass. The density of the heat-resistant material and the solid lubricant in the spherical annular base member and the outer layer was 1.62 Mg/m$^3$. In addition, as for the outer layer, the reinforcing member constituted by the metal wire net was contained at a ratio of 63.5% by mass, and the heat-resistant material containing the expanded graphite and the solid lubricant were contained at a ratio of 36.5% by mass.

Next, a description will be given of the results of tests conducted on the presence or absence of generation of abnormal frictional noise and the amount of gas leakage (l/min) by incorporating the spherical annular seal members obtained in Examples 1 to 15 and Comparative Examples 1 to 3 described above into the exhaust pipe spherical joint shown in FIG. 18.

<Test Conditions on Presence or Absence of Generation of Abnormal Frictional Noise>

Pressing force using coil springs (spring set force): 590 N

Oscillation angle: ±4°

Excitation frequency: 12 Hz

Temperature (outer surface temperature of the concave spherical surface portion 302 shown in FIG. 18):

from room temperature (25° C.) to 500° C.

Number of test oscillations: 1,000,000

Mating member (material of the flared portion 301 shown in FIG. 18):

SUS 304

<Test Method>

After 45,000 oscillating motions are performed at room temperature (25° C). by setting an oscillating motion at ±4° at an excitation frequency of 12 Hz as a unit of oscillation, the ambient temperature is raised to a temperature of 500° C., while continuing the oscillating motions (the number of oscillating motions during the temperature rise being 45,000). When the ambient temperature reached the temperature of 500° C., 115,000 oscillating motions are performed, and the ambient temperature is subsequently allowed to drop to room temperature while continuing the oscillating motions (the number of oscillating motions during the temperature drop being 45,000). The combined total of 250,00 oscillating motions is set as one cycle, and four cycles are performed.

The evaluation of the presence or absence of the occurrence of abnormal frictional noise was conducted at the aforementioned points in time, i.e., (1) after 250,000 oscillating motions, (2) after 500,000 oscillating motions, (3) after 750,000 oscillating motions, and (4) after 1,000,000 oscillating motions, as follows.

<Judgment Levels of Abnormal Frictional Noise>

Evaluation Code A: No abnormal frictional noise occurred.

Evaluation Code B: Abnormal frictional noise is slightly heard with the ear brought close to the test piece.

Evaluation Code C: Although the noise is generally difficult to discern from a fixed position (a position 1.5 m distant from the test piece) since it is blanketed by the noises of the living environment, the noise can be discerned as abnormal frictional noise by a person engaged in the test.

Evaluation Code D: The noise can be recognized as abnormal frictional noise (unpleasant sound) by anybody from the fixed position.

<Test Conditions of Gas Leakage and Test Method>

<Test Conditions>

Pressing force using coil springs (spring set force): 980 N

Excitation angle: ±2.5°

Excitation frequency (oscillation velocity): 5 Hz

Temperature (outer surface temperature of the concave spherical surface portion 302 shown in FIG. 18):

from room temperature (25° C.) to 500° C.

Number of oscillating motions: 1,000,000

Mating member (material of the flared portion 301 shown in FIG. 18):

SUS 304

<Test Method>

The temperature was raised up to 500° C. while continuing the oscillating motion at ±2.5° at an excitation frequency of 5 Hz at room temperature (25° C.). In a state in which that temperature is held, the oscillating motion was continued, and the amount of gas leakage was measured at the point of time when the number of oscillating motions reached 1,000,000.

<Measurement Method of Gas Leakage Amount>

An opening of the one upstream-side exhaust pipe 100 of the exhaust pipe spherical joint shown in FIG. 18 was closed, and dry air was allowed to flow into the joint portion from the other downstream-side exhaust pipe 300 side under a pressure of 0.049 Mpa (0.5 kgf/cm²). The amount of leakage from the joint portion (sliding contact portions between the surface 42 of the spherical annular seal member 38 and the flared portion 301, fitting portions between the cylindrical inner surface 32 of the spherical annular seal member 38 and the pipe end portion 101 of the upstream-side exhaust pipe 100, and abutting portions between the annular end face 34 and the flange 200 provided uprightly on the upstream-side exhaust pipe 100) was measured by means of a flowmeter 4 times, i.e., (1) at an early period of test (before testing start), (2) after 250,000 oscillating motions, (3) after 500,000 oscillating motions, and (4) after 1,000,000 oscillating motions.

Tables 1 to 5 show the results of the above-described tests.

TABLE 1

|  |  | Examples | | |
|---|---|---|---|---|
|  |  | 1 | 2 | 3 |
| <Heat-resistant Material (Expanded Graphite)> | | | | |
| Expanded graphite | | 100 | 100 | 100 |
| Phosphate (aluminum primary phosphate) | | — | — | — |
| Phosphorus pentoxide | | — | — | — |
| <Aqueous Dispersion> | | | | |
| FEP | | 12.5 | 27.5 | 37.5 |
| PFA | | — | — | — |
| PTFE | | — | — | — |
| Hexagonal boron nitride | | 37.5 | 22.5 | 12.5 |
| Graphite | | — | — | — |
| Alumina | | — | — | — |
| Surfactant | | 5 | 5 | 5 |
| Aqueous organic solvent | | — | — | — |
| Water | | 45 | 45 | 45 |
| <Coating Layer of Solid Lubricant> | | (sintered) | (sintered) | (sintered) |
| FEP | | 25 | 55 | 75 |
| PFA | | — | — | — |
| PTFE | | — | — | — |
| Hexagonal boron nitride | | 75 | 45 | 25 |
| Alumina | | — | — | — |
| Graphite | | — | — | — |
| <Judgment of Abnormal Frictional Noise> | (1) | A | A | A |
|  | (2) | A | A | A |
|  | (3) | A | A | A |
|  | (4) | A | A | A |
| Overall Judgment | | pass | pass | pass |
| Amount of gas leakage (l/min) | (1) | 0.05 | 0.05 | 0.05 |
|  | (2) | 0.14 | 0.10 | 0.12 |
|  | (3) | 0.28 | 0.22 | 0.26 |
|  | (4) | 0.46 | 0.38 | 0.44 |

TABLE 2

|  |  | Examples | | | |
|---|---|---|---|---|---|
|  |  | 4 | 5 | 6 | 7 |
| <Heat-resistant Material (Expanded Graphite)> | | | | | |
| Expanded graphite | | 100 | 100 | 100 | 100 |
| Phosphate (aluminum primary phosphate) | | — | — | — | — |
| Phosphorus pentoxide | | — | — | — | — |
| <Aqueous Dispersion> | | | | | |
| FEP | | — | 11.5 | 25.0 | 36.5 |
| PFA | | 27.5 | — | — | — |
| PTFE | | — | — | — | — |
| Hexagonal boron nitride | | 22.5 | 36.5 | 20.5 | 11.5 |
| Graphite | | — | 2.0 | 4.5 | 2.0 |
| Alumina | | — | — | — | — |
| Surfactant | | 5 | 5 | 5 | 5 |
| Aqueous organic solvent | | — | — | — | — |
| Water | | 45 | 45 | 45 | 45 |
| <Coating Layer of Solid Lubricant> | | (sintered) | (sintered) | (sintered) | (sintered) |
| FEP | | — | 23 | 50 | 73 |
| PFA | | 55 | — | — | — |
| PTFE | | — | — | — | — |
| Hexagonal boron nitride | | 45 | 73 | 41 | 23 |
| Alumina | | — | — | — | — |
| Graphite | | — | 4 | 9 | 4 |
| <Judgment of Abnormal Frictional Noise> | (1) | A | A | A | A |
|  | (2) | A | A | A | A |
|  | (3) | A | A | A | A |
|  | (4) | A | A | A | A |
| Overall Judgment | | pass | pass | pass | pass |
| Amount of gas leakage (l/min) | (1) | 0.05 | 0.05 | 0.05 | 0.05 |
|  | (2) | 0.10 | 0.14 | 0.10 | 0.12 |
|  | (3) | 0.23 | 0.28 | 0.20 | 0.26 |
|  | (4) | 0.40 | 0.46 | 0.36 | 0.44 |

TABLE 3

|  |  | Examples | | | |
|---|---|---|---|---|---|
|  |  | 8 | 9 | 10 | 11 |
| <Heat-resistant Material (Expanded Graphite)> | | | | | |
| Expanded graphite | | 100 | 100 | 96 | 91 |
| Phosphate (aluminum primary phosphate) | | — | — | 4 | 8 |
| Phosphorus pentoxide | | — | — | — | 1 |
| <Aqueous Dispersion> | | | | | |
| FEP | | 27.5 | 25.0 | 27.5 | 27.5 |
| PFA | | — | — | — | — |
| PTFE | | — | — | — | — |
| Hexagonal boron nitride | | 22.5 | 20.5 | 22.5 | 22.5 |
| Graphite | | — | 4.5 | — | — |
| Alumina | | — | — | — | — |
| Surfactant | | 5 | 5 | 5 | 5 |
| Aqueous organic solvent | | 5 | 5 | — | — |
| Water | | 40 | 40 | 45 | 45 |
| <Coating Layer of Solid Lubricant> | | (sintered) | (sintered) | (sintered) | (sintered) |
| FEP | | 55 | 50 | 55 | 55 |
| PFA | | — | — | — | — |
| PTFE | | — | — | — | — |
| Hexagonal boron nitride | | 45 | 41 | 45 | 45 |
| Alumina | | — | — | — | — |
| Graphite | | — | 9 | — | — |
| <Judgment of Abnormal Frictional Noise> | (1) | A | A | A | A |
|  | (2) | A | A | A | A |
|  | (3) | A | A | A | A |
|  | (4) | A | A | A | A |

TABLE 3-continued

|  |  | Examples | | | |
|---|---|---|---|---|---|
|  |  | 8 | 9 | 10 | 11 |
| Overall Judgment | | pass | pass | pass | pass |
| Amount of gas | (1) | 0.05 | 0.05 | 0.05 | 0.04 |
| leakage (l/min) | (2) | 0.10 | 0.10 | 0.08 | 0.06 |
|  | (3) | 0.23 | 0.20 | 0.20 | 0.18 |
|  | (4) | 0.42 | 0.36 | 0.28 | 0.24 |

TABLE 4

|  |  | Examples | | | |
|---|---|---|---|---|---|
|  |  | 12 | 13 | 14 | 15 |
| <Heat-resistant Material (Expanded Graphite)> | | | | | |
| Expanded graphite | | 96 | 96 | 91 | 91 |
| Phosphate (aluminum primary phosphate) | | 4 | 4 | 8 | 8 |
| Phosphorus pentoxide | | — | — | 1 | 1 |
| <Aqueous Dispersion> | | | | | |
| FEP | | 27.5 | 25.0 | 27.5 | 25.0 |
| PFA | | — | — | — | — |
| PTFE | | — | — | — | — |
| Hexagonal boron nitride | | 22.5 | 20.5 | 22.5 | 20.5 |
| Graphite | | — | 4.5 | — | 4.5 |
| Alumina | | — | — | — | — |
| Surfactant | | 5 | 5 | 5 | 5 |
| Aqueous organic solvent | | 5 | 5 | 5 | 5 |
| Water | | 40 | 40 | 40 | 40 |
| <Coating Layer of Solid Lubricant> | | (sintered) | (sintered) | (sintered) | (sintered) |
| FEP | | 55 | 50 | 55 | 50 |
| PFA | | — | — | — | — |
| PTFE | | — | — | — | — |
| Hexagonal boron nitride | | 45 | 41 | 45 | 41 |
| Alumina | | — | — | — | — |
| Graphite | | — | 9 | — | 9 |
| <Judgment of | (1) | A | A | A | A |
| Abnormal Frictional | (2) | A | A | A | A |
| Noise> | (3) | A | A | A | A |
|  | (4) | A | A | A | A |
| Overall Judgment | | pass | pass | pass | pass |
| Amount of gas | (1) | 0.05 | 0.05 | 0.04 | 0.04 |
| leakage (l/min) | (2) | 0.08 | 0.09 | 0.06 | 0.05 |
|  | (3) | 0.20 | 0.22 | 0.18 | 0.16 |
|  | (4) | 0.28 | 0.30 | 0.24 | 0.20 |

TABLE 5

|  |  | Comparative Examples | | |
|---|---|---|---|---|
|  |  | 1 | 2 | 3 |
| <Heat-resistant Material (Expanded Graphite)> | | | | |
| Expanded graphite | | 100 | 100 | 100 |
| Phosphate (aluminum primary phosphate) | | — | — | — |
| Phosphorus pentoxide | | — | — | — |
| <Aqueous Dispersion> | | | | |
| FEP | | — | — | — |
| PFA | | — | — | — |
| PTFE | | 50 | 50 | 33.0 |
| Hexagonal boron nitride | | — | — | 18.7 |
| Graphite | | — | — | — |
| Alumina | | — | — | 3.3 |
| Surfactant | | 5 | 5 | 5 |
| Aqueous organic solvent | | — | — | — |
| Water | | 45 | 45 | 40 |
| <Coating Layer of Solid Lubricant> | | (sintered) | | |
| FEP | | — | — | — |
| PFA | | — | — | — |
| PTFE | | 100 | 100 | 60 |
| Hexagonal boron nitride | | — | — | 34 |
| Alumina | | — | — | 6 |
| Graphite | | — | — | — |
| <Judgment of Abnormal Frictional | (1) | A | A | A |
| Noise> | (2) | B | B | A |
|  | (3) | D | D | C |
|  | (4) | D | D | D |
| Overall Judgment | | fail | fail | fail |
| Amount of gas leakage (l/min) | (1) | 0.05 | 0.05 | 0.06 |
|  | (2) | 0.28 | 0.26 | 0.18 |
|  | (3) | 0.42 | 0.34 | 0.23 |
|  | (4) | 2.16 | 1.96 | 1.76 |

From the test results shown in Tables 1 to 5, it can be appreciated that the spherical annular seal members in accordance with Examples 1 to 15 are superior to the spherical annular seal members in accordance with Comparative Examples 1 to 3 in the evaluation of abnormal frictional noise and the amount of gas leakage. In the evaluation of abnormal frictional noise, it can be conjectured that, in the case of the spherical annular seal members in accordance Comparative Examples 1 to 3, the solid lubricant of the outer layer dropped off or became worn away at a relatively early stage in sliding with the mating member, which resulted in a shift to direct sliding between the mating member and the heat-resistant material constituted by expanded graphite and caused the stick-slip phenomenon, thus generating abnormal frictional noise attributable to the stick-slip phenomenon. In the spherical annular seal members in accordance with Examples 1 to 15, a smooth surface where the reinforcing member made from the metal wire net and the sintered solid lubricant of the lubricating composition containing the molten fluorocarbon resin and hexagonal boron nitride or the molten fluorocarbon resin, hexagonal boron nitride, and graphite were integrated in mixed form was formed on the surface of the partially convex spherical surface serving as a surface of sliding friction with the mating member, so that the solid lubricant remained on the surface (sliding surface) without dropping off or becoming worn away at an early stage in the sliding friction with the mating member. Thus, it is possible to avoid direct sliding friction with the heat-resistant material constituted by expanded graphite, and the stick-slip phenomenon does not occur which is attributable to the large difference between the coefficient of static friction and the coefficient of dynamic friction of the heat-resistant material, thereby making it possible to prevent the generation of abnormal frictional noise due to the stick-slip phenomenon.

DESCRIPTION OF REFERENCE NUMERALS

4: belt-shaped metal wire net
5: reinforcing member
6: heat-resistant material
12: superposed assembly
13: tubular base member
20 outer-layer forming member
23: cylindrical preform
30: die
32: cylindrical inner surface 33: partially convex spherical surface
34: large-diameter side annular end face
35: small-diameter side annular end face
36: spherical annular base member
37: outer layer
38: spherical annular seal member

The invention claimed is:

1. A spherical annular seal member for use in an exhaust pipe joint, comprising: a spherical annular base member defined by a cylindrical inner surface, a partially convex spherical surface, and large- and small-diameter side annular end faces of said partially convex spherical surface; and an outer layer formed integrally on said partially convex spherical surface of said spherical annular base member,
wherein said spherical annular base member includes a first reinforcing member made from a metal wire net and a first heat-resistant material containing expanded graphite and compressed in such a manner as to fill meshes of the metal wire net of said first reinforcing member and to be integrated with said first reinforcing member in mixed form,
wherein, in said outer layer, a second heat-resistant material containing expanded graphite, a sintered solid lubricant of a lubricating composition, and a second reinforcing member made from a metal wire net are compressed such that said solid lubricant and said second heat-resistant material are filled in meshes of said second reinforcing member, and such that said solid lubricant, said second heat-resistant material, and said second reinforcing member are integrated in mixed form, an outer surface of said outer layer being formed into a smooth surface in which a surface constituted by said second reinforcing member and a surface constituted by said solid lubricant are present in mixed form,
wherein said lubricating composition consists of 45% by mass of hexagonal boron nitride and 55% by mass of a tetrafluoroethylene-hexafluoropropylene copolymer (FEP),
wherein each of said first heat-resistant material and said second heat-resistant material contains an aluminum primary phosphate at a ratio of 4 to 8% by mass, and
wherein each of said first heat-resistant material and said second heat-resistant material contains phosphorus pentoxide at a ratio of 0.05 to 5% by mass.

2. A spherical annular seal member for use in an exhaust pipe joint, comprising:
a spherical annular base member defined by a cylindrical inner surface, a partially convex spherical surface, and large- and small-diameter side annular end faces of said partially convex spherical surface; and
an outer layer formed integrally on said partially convex spherical surface of said spherical annular base member,
wherein said spherical annular base member includes a first reinforcing member made from a metal wire net and a first heat-resistant material containing expanded graphite and compressed in such a manner as to fill meshes of the metal wire net of said first reinforcing member and to be integrated with said first reinforcing member in mixed form,
wherein, in said outer layer, a second heat-resistant material containing expanded graphite, a sintered solid lubricant of a lubricating composition, and a second reinforcing member made from a metal wire net are compressed such that said solid lubricant and said second heat-resistant material are filled in meshes of said second reinforcing member, and such that said solid lubricant, said second heat-resistant material, and said second reinforcing member are integrated in mixed form, an outer surface of said outer layer being formed into a smooth surface in which a surface constituted by said second reinforcing member and a surface constituted by said solid lubricant are present in mixed form,
wherein said lubricating composition consists of 41 to 45% by mass of hexagonal boron nitride, 50 to 55% by mass of a tetrafluoroethylene-hexafluoropropylene copolymer (FEP) and not more than 9% by mass of graphite,
wherein each of said first heat-resistant material and said second heat-resistant material contains an aluminum primary phosphate at a ratio of 4 to 8% by mass, and
wherein each of said first heat-resistant material and said second heat-resistant material further contains phosphorus pentoxide at a ratio of 0.05 to 5% by mass.

3. A spherical annular seal member for use in an exhaust pipe joint, comprising:
a spherical annular base member defined by a cylindrical inner surface, a partially convex spherical surface, and large- and small-diameter side annular end faces of said partially convex spherical surface; and
an outer layer formed integrally on said partially convex spherical surface of said spherical annular base member,
wherein said spherical annular base member includes a first reinforcing member made from a metal wire net and a first heat-resistant material containing expanded graphite and compressed in such a manner as to fill meshes of the metal wire net of said first reinforcing member and to be integrated with said first reinforcing member in mixed form,
wherein, in said outer layer, a second heat-resistant material containing expanded graphite, a sintered solid lubricant of a lubricating composition, and a second reinforcing member made from a metal wire net are compressed such that said solid lubricant and said second heat-resistant material are filled in meshes of said second reinforcing member, and such that said solid lubricant, said second heat-resistant material, and said second reinforcing member are integrated in mixed form, an outer surface of said outer layer being formed into a smooth surface in which a surface constituted by said second reinforcing member and a surface constituted by said solid lubricant are present in mixed form,
wherein said lubricating composition consists of 23 to 75% by mass of hexagonal boron nitride, 23 to 75% by mass of molten fluorocarbon resin and not more than 16% by mass of graphite, and
wherein either one of a tetrafluoroethylene-hexafluoropropylene copolymer (FEP) and a tetrafluoroethylene-perfluoroalkylvinylether copolymer (PFA) is used as said molten fluorocarbon resin in said lubricating composition.

4. The spherical annular seal member according to claim 3, wherein each of said first heat-resistant material and said second heat-resistant material contains a phosphate at a ratio of 0.1 to 16% by mass.

5. The spherical annular seal member according to claim 3, wherein each of said first heat-resistant material and said second heat-resistant material further contains phosphorus pentoxide at a ratio of 0.05 to 5% by mass.

6. A spherical annular seal member for use in an exhaust pipe joint, comprising:
- a spherical annular base member defined by a cylindrical inner surface, a partially convex spherical surface, and large- and small-diameter side annular end faces of said partially convex spherical surface; and
- an outer layer formed integrally on said partially convex spherical surface of said spherical annular base member,
- wherein said spherical annular base member includes a first reinforcing member made from a metal wire net and a first heat-resistant material containing expanded graphite and compressed in such a manner as to fill meshes of the metal wire net of said first reinforcing member and to be integrated with said first reinforcing member in mixed form,
- wherein, in said outer layer, a second heat-resistant material containing expanded graphite, a sintered solid lubricant of a lubricating composition, and a second reinforcing member made from a metal wire net are compressed such that said solid lubricant and said second heat-resistant material are filled in meshes of said second reinforcing member, and such that said solid lubricant, said second heat-resistant material, and said second reinforcing member are integrated in mixed form, an outer surface of said outer layer being formed into a smooth surface in which a surface constituted by said second reinforcing member and a surface constituted by said solid lubricant are present in mixed form,
- wherein said lubricating composition consists of 23 to 75% by mass of hexagonal boron nitride and 23 to 75% by mass of molten fluorocarbon resin, and
- wherein either one of a tetrafluoroethylene-hexafluoropropylene copolymer (FEP) and a tetrafluoroethylene-perfluoroalkylvinylether copolymer (PFA) is used as said molten fluorocarbon resin in said lubricating composition.

7. The spherical annular seal member according to claim 6, wherein each of said first heat-resistant material and said second heat-resistant material contains a phosphate at a ratio of 0.1 to 16% by mass.

8. The spherical annular seal member according to claim 6, wherein each of said first heat-resistant material and said second heat-resistant material further contains phosphorous pentoxide at a ratio of 0.05 to 5% by mass.

* * * * *